United States Patent
Zhang et al.

(10) Patent No.: US 11,596,004 B2
(45) Date of Patent: Feb. 28, 2023

(54) ACTIVATION AND DEACTIVATION OF RANDOM ACCESS CHANNEL OCCASIONS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Franklin Park, NJ (US); Sony Akkarakaran, Poway, CA (US); Jelena Damnjanovic, Del Mar, CA (US); Navid Abedini, Basking Ridge, NJ (US); Kapil Gulati, Belle Mead, NJ (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/212,976

(22) Filed: Mar. 25, 2021

(65) Prior Publication Data

US 2022/0312487 A1   Sep. 29, 2022

(51) Int. Cl.
*H04W 74/08* (2009.01)
*H04L 5/14* (2006.01)
(Continued)

(52) U.S. Cl.
CPC .......... *H04W 74/0833* (2013.01); *H04L 5/14* (2013.01); *H04W 56/001* (2013.01);
(Continued)

(58) Field of Classification Search
None
See application file for complete search history.

(56) References Cited

U.S. PATENT DOCUMENTS

| 2012/0008575 A1* | 1/2012 | Vujcic | H04W 74/002 370/329 |
| 2012/0063305 A1* | 3/2012 | Chiu | H04W 74/0833 370/252 |

(Continued)

FOREIGN PATENT DOCUMENTS

| WO | WO-2019098770 A1 * | 5/2019 | ........... H04L 5/0048 |
| WO | WO-2020198512 A1 * | 10/2020 | ........ H04W 74/0833 |
| WO | WO-2022064241 A1 * | 3/2022 | |

OTHER PUBLICATIONS

Intel, "Initial Access Signal/Channels for NR-Unlicensed", R1-1912194 as submitted by the applicant dated Jun. 20, 2022 (Year: 2019).*

(Continued)

*Primary Examiner* — Jamaal Henson
(74) *Attorney, Agent, or Firm* — Holland & Hart LLP

(57) ABSTRACT

Methods, systems, and devices for wireless communications are described. Generally, the described techniques provide for dynamically activating and deactivating random-access channel (RACH) occasions (ROs). A base station may configure one or more ROs on which a user equipment (UE) can transmit RACH messages. If higher priority signaling (e.g., downlink signaling or uplink signaling) overlaps in time with the ROs, the base station may deactivate one or more ROs to decrease the likelihood of self-interference or cross-link interference (e.g., if the UE or the base station are operating in full duplex mode). The base station may deactivate or activate ROs by indicating indices for one or more ROs, indices for one or more synchronization signal blocks (SSBs), a pattern of ROs, some or all ROs within a time period, some or all ROs until a next downlink signal updates the RO configuration or activates ROs, or any combination thereof.

30 Claims, 17 Drawing Sheets

(51) Int. Cl.
  *H04W 56/00* (2009.01)
  *H04W 72/044* (2023.01)
  *H04W 72/12* (2023.01)
  *H04W 72/1273* (2023.01)

(52) U.S. Cl.
  CPC ..... *H04W 72/044* (2013.01); *H04W 72/1242* (2013.01); *H04W 72/1273* (2013.01)

(56) References Cited

U.S. PATENT DOCUMENTS

| | | | |
|---|---|---|---|
| 2013/0242730 A1* | 9/2013 | Pelletier | H04W 74/0833 370/230 |
| 2016/0219570 A1* | 7/2016 | Guo | H04W 72/085 |
| 2019/0306892 A1* | 10/2019 | Xiong | H04W 88/02 |
| 2020/0154377 A1* | 5/2020 | Qian | H04W 72/046 |
| 2020/0229242 A1* | 7/2020 | Xiong | H04W 74/008 |
| 2021/0014902 A1* | 1/2021 | Guo | H04L 5/0091 |
| 2021/0029738 A1 | 1/2021 | Zhou et al. | |
| 2021/0029768 A1* | 1/2021 | Shih | H04W 36/0079 |
| 2022/0086774 A1* | 3/2022 | Qian | H04B 7/00 |

OTHER PUBLICATIONS

Intel, "Initial Access Signal/Channel for NR-Unlicensed", R1-1912194 as submitted by the applicant dated Jun. 20, 2022 (Year: 2019).*
Ericsson: "IAB RACH Extensions (revision of R1-1904833)", 3GPP TSG-RAN WG1 Meeting #96bis, 3GPP Draft, R1-1905595, 3RD Generation Partnership Project (3GPP), Mobile Competence Centre, 650, Route Des Lucioles, F-06921, Sophia-Antipolis Cedex, France, Vol. RAN WG1, No. Xi'an, China, 20190408-20190412, Apr. 7, 2019 (Apr. 7, 2019), XP051700353, pp. 1-4, Retrieved from the Internet: URL: http://www.3gpp.org/ftp/Meetings%5F3GPP%5FSYNC/RAN1/Docs/R1%2D1905595%2Ezip [retrieved on Apr. 7, 2019] page 3, lines 6-24.
Intel Corporation: "Initial Access Signals/Channels for NR-Unlicensed", 3GPP TSG RAN WGI Meeting #99, 3GPP Draft, R1-1912194, 3RD Generation Partnership Project (3GPP), Mobile Competence Centre, 650, Route Des Lucioles, F-06921, Sophia-Antipolis Cedex, France, Vol. RAN WG1, No. Reno, USA, 20191118-201911229, Nov. 2019 (Nov. 9, 2019), XP051823271, 13 Pages, Retrieved from the Internet: URL: https://ftp.3gpp.org/tsg_ran/WG1_RL1/TSGR1_99/Docs/R1-1912194.zip R1-1912194—Intel—Initial access channels forNR-U.docx [retrieved on Nov. 9, 2019] section 3.4.
International Search Report and Written Opinion—PCT/US2022/016981—ISA/EPO—May 12, 2022.

* cited by examiner

ACTIVATION AND DEACTIVATION OF RANDOM ACCESS CHANNEL OCCASIONS

FIELD OF TECHNOLOGY

The following relates to wireless communications, including activation and deactivation of random access channel occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support activation and deactivation of random access channel occasions. Generally, the described techniques provide for dynamically activating and deactivating random-access channel (RACH) occasions (ROs). A base station may configure one or more ROs on which a user equipment (UE) can transmit RACH messages. If higher priority signaling (e.g., downlink signaling or uplink signaling) overlaps in time with the ROs, the base station may deactivate one or more ROs to decrease the likelihood of self-interference or cross-link interference (e.g., if the UE or the base station are operating in full duplex mode). The base station may deactivate or activate ROs by indicating indices for one or more ROs, indices for one or more synchronization signal blocks (SSBs), a pattern of ROs, some or all ROs within a time period, some or all ROs until a next downlink signal updates the RO configuration or activates ROs, or any combination thereof. In some examples, the base station may additionally or alternatively configure the UE with updated RACH parameters for full duplex, such as updated beams, updated beam pairs, updated transmit power, a guard period, etc.

DETAILED DESCRIPTION

In some examples, wireless communications systems may support full duplex operations at a base station, a user equipment (UE), or both. In examples where a UE is operating in full duplex mode (e.g., simultaneously transmitting uplink communications and receiving downlink communications), the UE may generate self-interference. In examples where the base station is operating in full duplex mode, uplink communications from a first UE may generate cross-link interference. In some examples, downlink communications may have a higher priority than uplink communications that may generate interference. For instance, the downlink communications may be ultra reliable low latency communications (URLLC), which may have a higher priority or lower latency tolerance than uplink signaling (e.g., random-access channel (RACH) messages). However, uplink RACH messages in a full duplex scenario may result in interference that may result in failure of high priority signaling, increased latency, reduced user experience, or the like.

In some examples, a base station may configure one or more RACH occasions (ROs) on which to transmit ROs. However, in some cases, one or more of the configured ROs may overlap in time with higher priority signaling. TO reduce the likelihood of interference with the higher priority signaling, a base station may dynamically activate or deactivate ROs. The base station may deactivate or activate ROs by indicating indices for one or more ROs, indices for one or more synchronization signal blocks (SSBs), a pattern of ROs, some or all ROs within a time period, some or all ROs until a next downlink signal updates the RO configuration or activates ROs, or any combination thereof. In some examples, the base station may additionally or alternatively configure the UE with updated RACH parameters for full duplex, such as updated beams, updated beam pairs, updated transmit power, a guard period, etc.

Techniques described herein may be implemented to realize one or more advantages. For example, devices described herein may activate and deactivate ROs, which may decrease the likelihood of self-interference or cross-link interference or both, support prioritization of higher priority signaling, support full duplex and half duplex operations, and the like. Such techniques may further result in decreased system latency, increased system efficiency, more efficient utilization resources, improved battery life, improved user experience, etc.

Aspects of the disclosure are initially described in the context of wireless communications systems. Aspects of the disclosure are further illustrated by and described with reference to wireless communications systems, resource allocations, timelines, and process flows. Aspects of the disclosure are further illustrated by and described with reference to apparatus diagrams, system diagrams, and flowcharts that relate to activation and deactivation of random access channel occasions.

Figure 1:
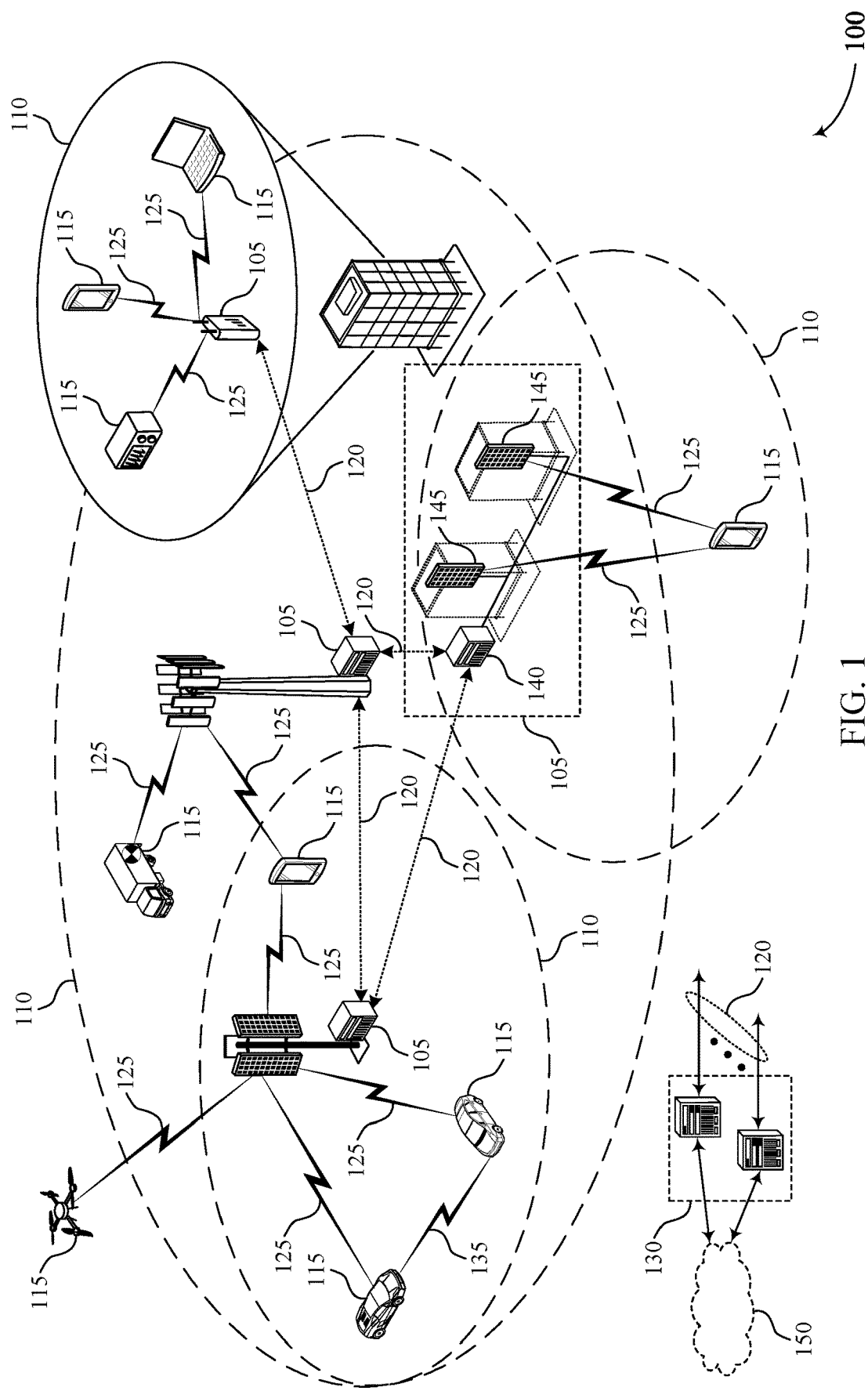
FIG. 1 illustrates an example of a wireless communications system that supports activation and deactivation of random access channel occasions in accordance with aspects of the present disclosure.

FIG. 1 illustrates an example of a wireless communications system 100 that supports activation and deactivation of random access channel occasions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, the described techniques provide for dynamically activating and deactivating ROs. A base station 105 may configure one or more ROs on which a UE 115 may transmit RACH messages. If higher priority signaling (e.g., downlink signaling or uplink signaling) overlaps in time with the ROs, the base station 105 may deactivate one or more ROs to decrease the likelihood of self-interference or cross-link interference (e.g., if the UE 115 or the base station 105 are operating in full duplex mode). The base station 105 may deactivate or activate ROs by indicating indices for one or more ROs, indices for one or more SSBs, a pattern of ROs, some or all ROs within a time period, some or all ROs until a next downlink signal updates the RO configuration or activates ROs, or any combination thereof. In some examples, the base station 105 may additionally or alternatively configure the UE 115 with updated RACH parameters for full duplex, such as updated beams, updated beam pairs, updated transmit power, a guard period, etc.

Figure 2:
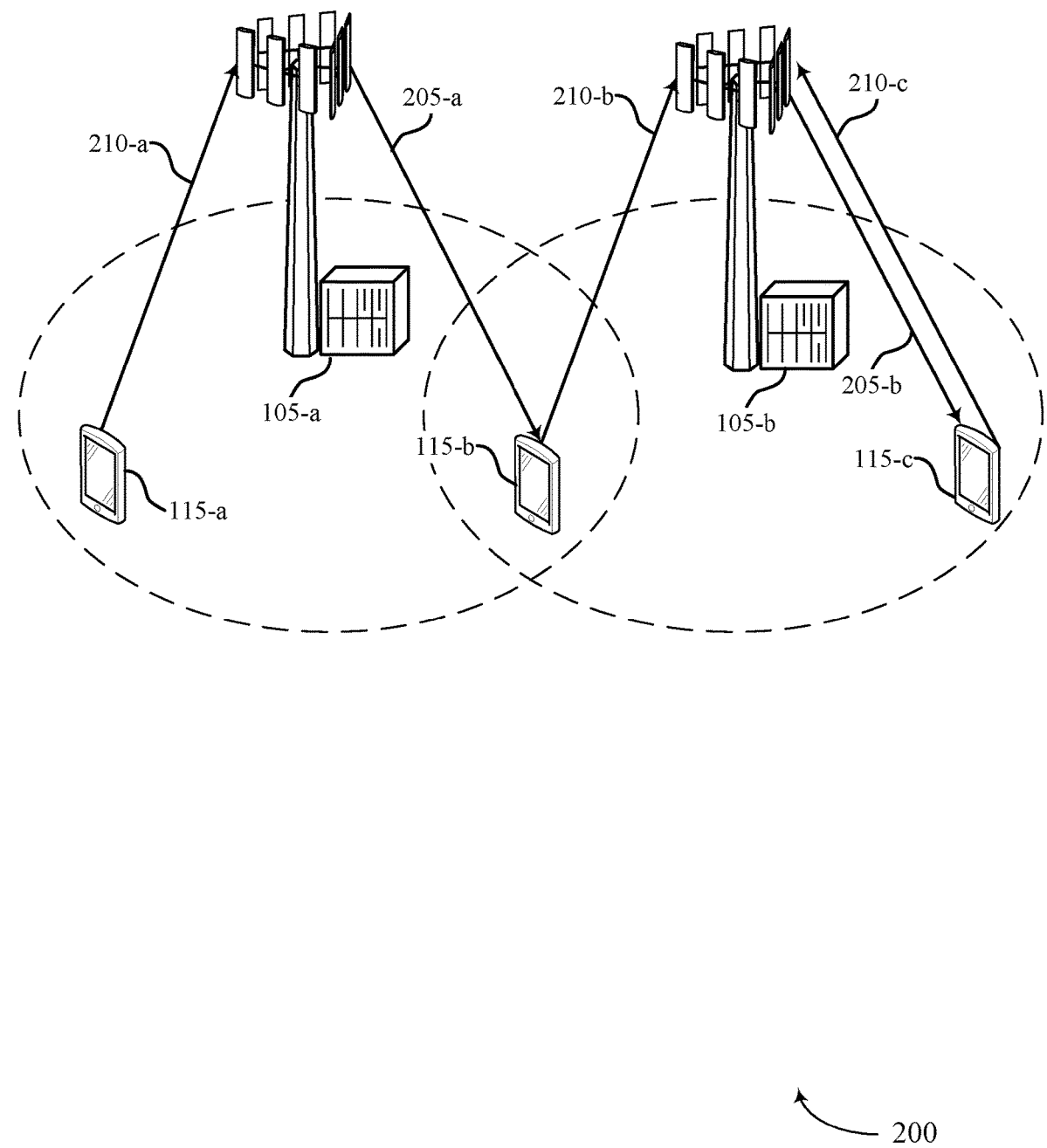
FIG. 2 illustrates an example of a wireless communications system that supports activation and deactivation of random access channel occasions in accordance with aspects of the present disclosure.

FIG. 2 illustrates an example of a wireless communications system 200 that supports activation and deactivation of random access channel occasions in accordance with aspects of the present disclosure. Wireless communications system 200 may include one or more base stations (e.g., base station 105-*a*, base station 105-*b*, etc.), and one or more UEs (e.g., UE 115-*a*, UE 115-*b*, UE 115-*c*, etc.), which may be examples of corresponding devices described with reference to FIG. 1. Base stations 105 may be examples of IAB notes, or other devices as described with reference to FIG. 1.

In some examples, one or more wireless devices in wireless communications system 200 may support half duplex communications, full duplex communications, or both. A device in half duplex communication mode may communicate in a single direction at the same time (e.g., uplink communications or downlink communications, but not both simultaneously). A device in full duplex communication mode may simultaneously support both uplink and downlink communications. In such examples, full duplex capability may be present at a base station 105, a UE 115, or both. For instance, UE 115 may support uplink communications on one antenna panel, while downlink reception may be supported by another antenna panel. In some examples, a base station 105 may support uplink communications at a first antenna panel and downlink communications at a second antenna panel. Full duplex capability may be conditional on beam separation etc.

For example, UE 115-*b* may communicate in full duplex mode (e.g., with base station 105-*a* and base station 105-*b*). In such examples, UE 115-*b* may receive downlink communications 205-*a* from base station 105-*a*, and may simultaneously transmit uplink communications 210-*b* to base station 105*b*. In such examples, flexible TDD communications may be disabled at one or more of base station 105-*a* and base station 105-*b*, and flexible TDD communications may be enabled at UE 15-*b* (e.g., for mTRPs). In some examples, a base station 105 may operate in a full duplex mode. For example, base station 105-*b* may simultaneously receive uplink communications 210-*b* from UE 115-*b* and may transmit downlink communications 205-*b* to UE 115-*c*. In such examples, flexible TDD communications may be enabled at base station 105-*b*, and flexible TDD communications may be disabled at one or both of UE 115-*b* and UE 115-*c*. In some examples, a UE and a base station may both communicate in full duplex mode. For example, base station 105-*b* and UE 115-*c* may both operate in full duplex mode. Base station 105-*b* may support simultaneous downlink communications 205-*b* and uplink communications 210-*c*. Similarly, UE 115-*c* may support simultaneous uplink communications 210-*c* and downlink communications 205-*b*. In such examples, flexible TDD may be enabled at base station 105-*b* and at UE 115-*c*.

Full duplex operations may allow for simultaneous uplink and downlink transmissions in various frequency ranges (e.g., FR2), as part of one or more communication procedures. Wireless devices may utilize full duplex procedures as part of IAB networks.

Full duplex operations may provide one or more benefits to wireless devices in wireless communications system 200. For example, full duplex operations may result in latency reduction. If UE 115-*b* or UE 115-*c* receives downlink signals during uplink slots, latency may be reduced, resulting in more efficient communications and improved user experience. In some examples, full duplex operations may result in spectrum efficiency enhancements (e.g., on a per cell basis, a per device basis, or the like). Additionally, or alternatively, full duplex operations may result in more efficient resource utilization.

In such examples full duplex operations may result in increased interference. For example, if UE 115-*b* is operating in full duplex mode, it may be receiving downlink communications 205-*a* while simultaneously transmitting uplink communications 210-*b*. In some examples, UE 115-*b* may generate self-interference. (e.g., uplink communications 210-*b* may interfere with downlink communications 205-*a*). That is, while monitoring for downlink communications 205-*a* from base station 105-*a*, UE 115-*b* may transmit uplink communications 210-*b* to base station 105-*b*. In such examples, UE 115-*b* may also sense its own transmitted uplink communications 210-*b* while attempting to receive downlink communications 205-*a* (e.g., self-interference). Any UE 115 operating in full duplex mode (e.g., UE 115-*c*) may similarly generate some level of self-interference. In some examples, self-interference may be mitigated or may be less than a threshold amount, which may not have a substantial impact on communications. However, in some examples, self-interference may result in one or more failed transmissions, one or more retransmissions, or the like. In some examples, even such impacts may disrupt communications (e.g., may not satisfy requirements for high priority communications such as ultra-reliable low latency communications (URLLC)).

In some cases, a UE 115 (e.g., operating in half duplex mode or full duplex mode) may generate cross-link interference when a baes station is operating in full duplex mode. For example, base station 105-*a* may operate in full duplex mode. Base station 105-*a* may simultaneously receive uplink communications 210-*a* and transmit downlink communications 205-*a*. In some examples, uplink communication 210-*a* may interfere with downlink communications 205-*a*. That is, while UE 115-*b* monitors for downlink communications 250-*a*, it may also sense uplink communications 210-*a*, which may result in one or more failed transmissions, retransmissions, system delays, increased latency, etc. Even in cases where such impacts are mitigated or reduced, even small amounts of interference or relatively rare failed transmissions may have a significant negative impact on communications system 200 (e.g., in the case of interference with high priority signaling such as URLLC).

In some examples, as described in greater detail with reference to FIG. 3, a base station 105 may configure a UE 115 with one or more random-access channel (RACH) occasions (ROs), for transmitting RACH messages. A UE 115 may select an RO for transmitting the RACH messages (e.g., based on a synchronization signal block (SSB) associated with the RO, base station instruction, or the like). Each RO may be defined by time resources, frequency resources, spatial resources, or any combination thereof. UEs 115 may utilize the ROs for transmitting random-access messages during various RACH procedures (e.g., to establish a connection in a disconnected mode, as part of a handover, beam refinement procedure, beam selection procedure, or other beam management procedure in connected mode, or the like). In some examples, a UE 115 may transmit uplink communications 210 that include RACH messages on one or more ROs. However, as described herein, such uplink communications may result in self-interference if the UE 115 is operating in full duplex mode, or cross-link interference of the receiving base station 105 is operating in full duplex mode, or both.

In some examples, as described herein, a base station 105 may configure one or more ROs. The base station may dynamically activate or deactivate one or more of the ROs (e.g., to mitigate or avoid cross-link interference, self-interference, or both). RO configuration that may result in interference is described in greater detail with reference to FIG. 3. Activation and deactivation of ROs is described in greater detail with reference to FIGS. 3-5.

Figure 3:
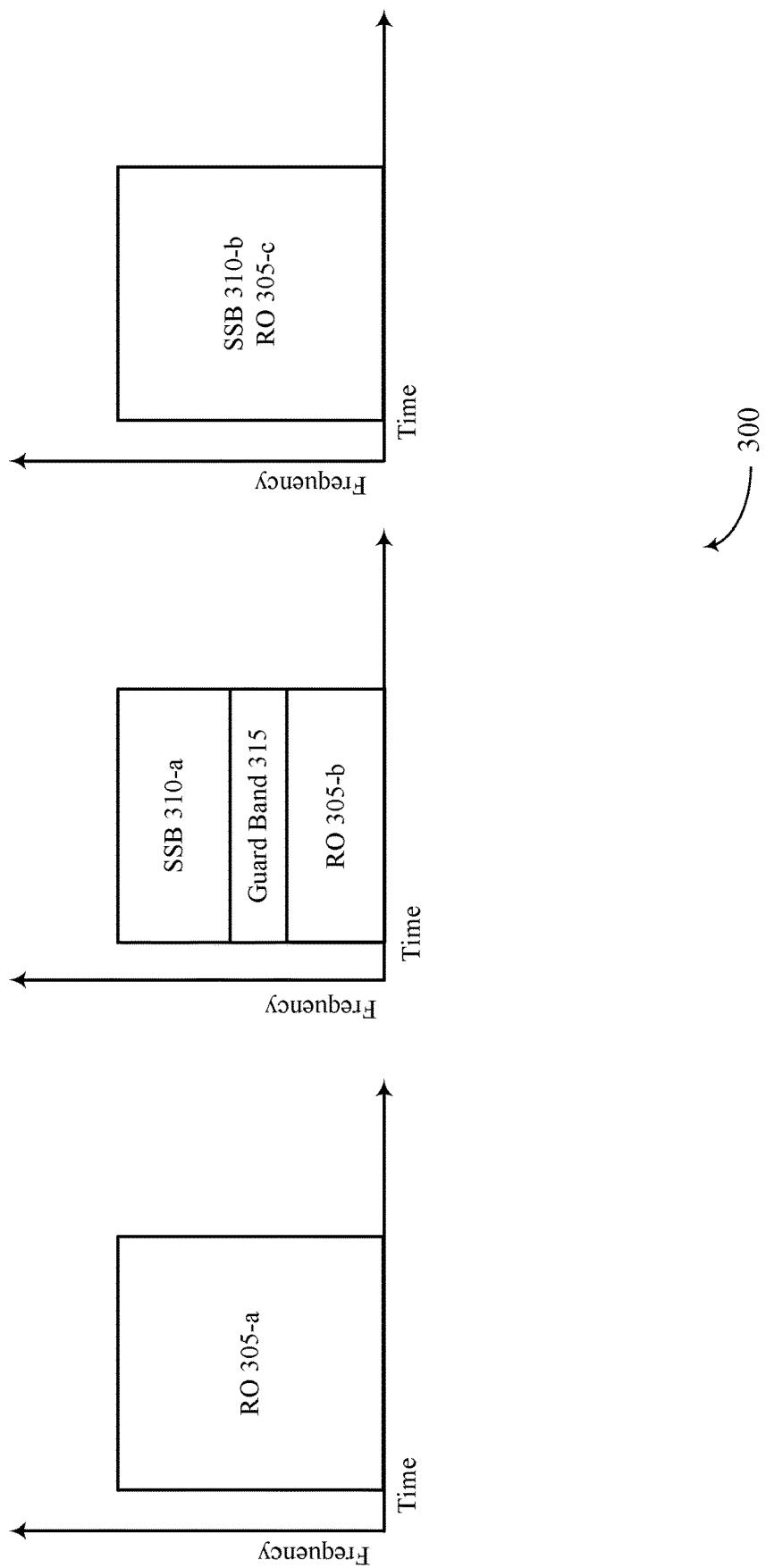
FIG. 3 illustrates an example of a resource configuration that supports activation and deactivation of random access channel occasions in accordance with aspects of the present disclosure.

FIG. 3 illustrates an example of a resource configuration 200 that supports activation and deactivation of random access channel occasions in accordance with aspects of the present disclosure. In some examples, resource configuration 200 may be configured by or implemented by one or more wireless devices, such as base stations and UEs, which may be examples of corresponding devices described with reference to FIGS. 1-2.

In some examples, a wireless device (e.g., a UE 115) may operate in half duplex mode. For instance, as described with reference to FIG. 2, a UE 115-a may operate in half duplex mode. In such examples, UE 115-a may perform uplink or downlink communication at any given time (e.g., but may not simultaneously perform uplink and downlink communications). In such examples, a base station (e.g., base station 105-a) may configure one or more ROs 305-a. ROs 305-a may be TDMed with downlink communications. For example, RO 305-a may not overlap in time with downlink communications including SSBs, PDCCHs, PDSCHs, CSI-RSs, or the like. In such examples, a UE 115 may experience long access delays. To decrease access delays, a UE 115 may operate in full duplex mode (e.g., instead of in half duplex mode). In such examples, ROs 305 may be permitted to overlap in time with one or more downlink transmissions.

Downlink transmissions (e.g., SSBs 310, PDCCHs, PDSCHs, CSI-RSs, or the like) may overlap with ROs 305 (e.g., if a UE 115 is operating in full duplex mode). In some examples, downlink transmissions (e.g., SSB 310-a) may be FDMed with ROs 305 (e.g., RO305-b). Such overlap in time may improve system efficiency and support lower latency. Thus, RO 305-b and SSB 310-a may overlap at least partially in time (e.g., may share one or more time resources), but may be span different or partially different frequency resources (e.g., may be separated by a guard band 315).

Downlink transmissions (e.g., SSBs 310, PDCCHs, PDSCHs, CSI-RSs, or the like), may overlap with ROs 305 in time. In some examples, downlink transmissions (e.g., SSB 310-b) may be SDMed with RO 305-c. In such examples, the downlink transmission (e.g., SSB 310-b) may share the same or partially overlapping time resources and frequency resources.

In cases where downlink transmissions overlap at least partially in time with ROs 305 (e.g., via FDM or SDM transmission configurations) for a UE 115, uplink transmissions of RACH messages on the ROs 305 may result in interference (e.g., self-interference for the transmitting UE 115 or cross-link interference for a base station 105 operating in full duplex mode). Even if the UE 115 configured with the ROs 305 is operating in a half duplex mode, a RACH message transmitted on the ROs 305 may result in cross-link interference for another UE 115, or self-interference at a base station operating in full duplex mode, or the like. Thus, in any case where an RO 305 is schedule, RACH messages transmitted on one or more scheduled ROs 305 may result in some level of interference.

In some examples, transmission of RACH messages on configured ROs 305 may conflict with or otherwise interfere with higher priority signaling (e.g., downlink signaling). For example, for a UE 115 operating in full duplex mode (e.g., UE 115-b as described with reference to FIG. 2), downlink communications 205-a may be more urgent or may have a higher priority level than uplink transmissions 210-b transmitted on one or more ROs 305. For example, downlink communications 205-a may be URLLC communications, subject to timing constraints and demanding reliability constraints. In such examples, base station 105-a or base station 105-b may deactivate one or more ROs that overlap in time with the higher priority downlink communications 205-a. For instance, to increase the likelihood of successful URLLC downlink communications 205-a (e.g., which may be associated with higher reliability and shorter latency requirements), base station 105-b may deactivate an RO that overlaps with the URLLC downlink communications 205-a. This may reduce or eliminate UE self-interference impact (e.g., supporting the reliability of downlink communications 205-a).

In some examples, transmission of RACH messages on configured ROs 305 by one UE 115 may conflict with or otherwise interfere with higher priority signaling (e.g., downlink signaling) for another UE. For example, for a base station operating in full duplex mode (e.g., base station 105-a as illustrated with reference to FIG. 2), the base station may deactivate one or more ROs 305 to increase the likelihood that a higher priority downlink signal addressed to another UE will be successfully received. For instance, downlink communication 205-a may be higher priority signaling than a RACH message included in uplink communications 210-a. In such examples, if ROs 305 for transmitting RACH uplink communications 210-a overlap in time with downlink communications 205-a (e.g., URLLC), then base station 105-a may deactivate one or more ROs 305 to increase the likelihood of successful reception of URLLC downlink communications 205-a that have a higher urgency or higher priority level. Deactivating ROs 305 for UE 115-a may result in decreased or eliminated cross-link interference generated by UE 115-a and affecting UE 115-b. This may be the case regardless of whether UE 115-a is operating in full duplex mode or half duplex mode.

Deactivation of ROs 305 may apply to a single RO 305, multiple ROs 305, a pattern of ROs 305, all ROs 305 until a timer expires, or all ROs 305 until a next dynamic activation signal, or any combination thereof, as described in greater detail with reference to FIGS. 4 and 5.

Figure 4:
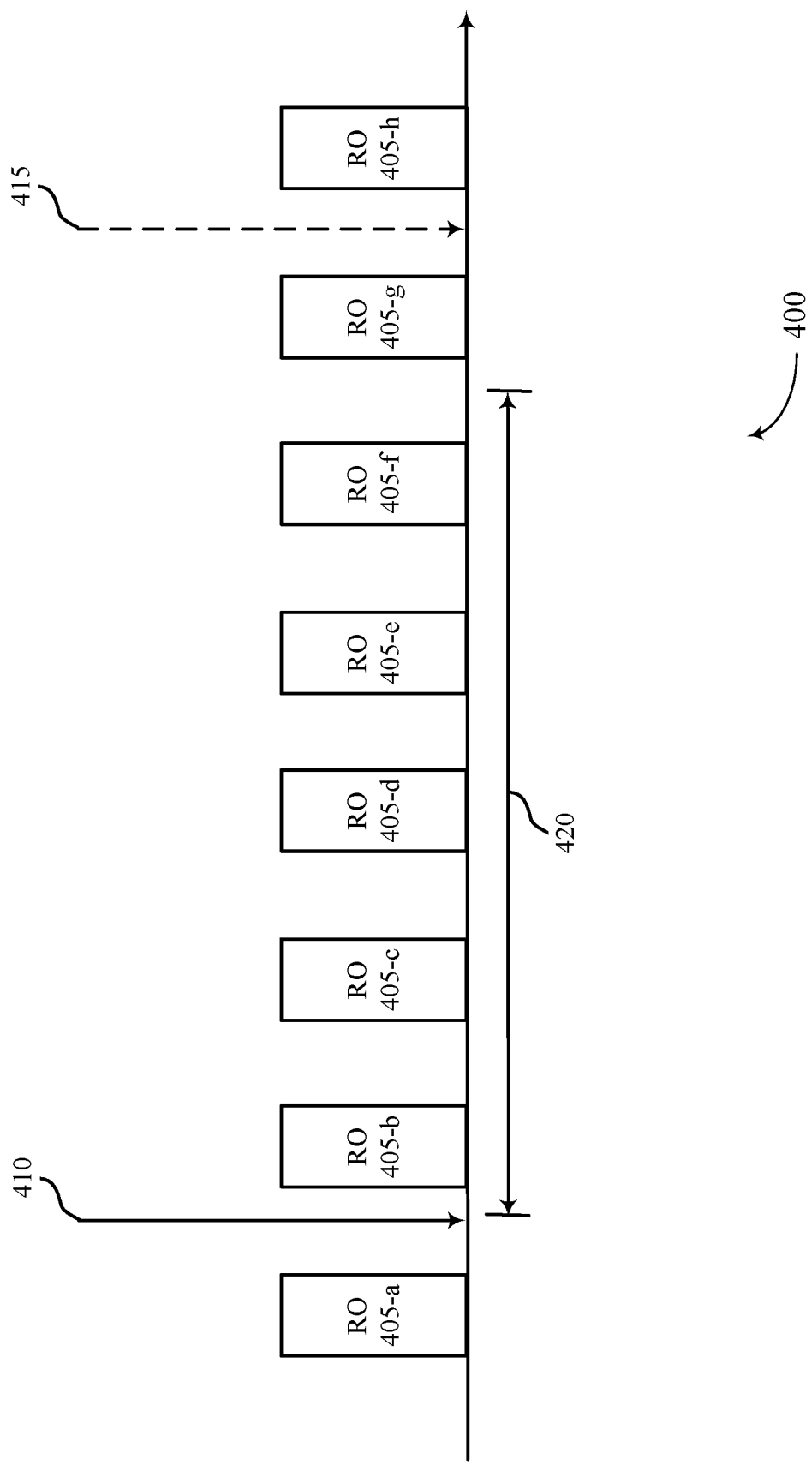
FIG. 4 illustrates an example of a timeline that supports activation and deactivation of random access channel occasions in accordance with aspects of the present disclosure.

FIG. 4 illustrates an example of a timeline 400 that supports activation and deactivation of random access channel occasions in accordance with aspects of the present disclosure. Timeline 400 may implement or be implemented by one or more base stations and UEs, which may be examples of corresponding devices described with reference to FIGS. 1-3.

A base station 105 may configure one or more ROs 405 for a UE 115. The UE 115 may transmit RACH messages (e.g., at 535) on the configured ROs 405 (e.g., in connected mode). In some examples, each RO may be associated with an index value for the RO 405, an index value for an SSB associated with the RO 405, or both. Techniques described herein may be implemented for a UE 115 that is operating in full duplex mode, a UE 115 that is operating in half duplex mode, a base station 105 operating in full duplex mode, or a base station 105 operating in half duplex mode, or any combination thereof.

In some examples, a base station 105 may activate or deactivate one or more ROs 405. For example, base station 105 may identify one or more ROs 405 configured for UE 115 (e.g., when UE 115 is in a connected mode), and the one or more ROs 405 may at least partially overlap in time with a downlink message. The downlink message may have a higher priority level than a RACH message for the ROs 405 (e.g., may be a URLLC message). In such examples, base station 105 may transmit a downlink message 410 to UE 115. The downlink message may include an instruction to deactivate one or more configured ROs 405. The downlink message may be a DCI message, a MAC-CE message, a higher layer signaling message (e.g., an RRC message), or any combination thereof. For instance, the downlink message may be a DCI. The DCI may a dedicated DCI (e.g., for UE 115) or a common group DCI (e.g., among multiple UEs including UE 115).

Downlink message 410 may include instructions to deactivate one or more configured ROs 405. The instructions to deactivate the ROs 405 may include an index for a single RO. For example, base station 105 may determine that RO 405-b overlaps at least partially in time with a higher priority downlink signal. In such examples, downlink message 410 may include an index value for RO 405-b, or an index value for an SSB associated with RO 405-b. In such examples, UE 115 may deactivate RO 405-b, and may ignore RO 405-b (e.g., UE 115 may refrain from selecting RO 405-b for transmitting RACH messages, or may refrain from transmitting RACH messages on RO 405-b). In such examples, UE 115 may deactivate RO 405-b, but may consider subsequent ROs 405 (e.g., RO 405-c, RO 405-d, etc.) as active. In some examples, downlink message 410 may include multiple indices (e.g., RO 405 indices, or SSB indices associated with ROs 405). In such examples, UE 115 may deactivate ROs 405 indicated by the multiple indices, but may consider all other ROs 405 to be active. The UE 115 may consider only active ROs that are active when selecting an RO for transmission of a RACH message (e.g., a RACH preamble). For example, if a RO is deactivated by a downlink message 410 the UE 115 may consider only ROs in a set of activated ROs that does not included deactivated ROs when selecting a RO for RACH preamble transmission. Thus, by activating or deactivating ROs in a downlink message a base station 105 can dynamically configure a set of activated ROs from which the UE 115 can select a RO.

Downlink message 410 may indicate a set of one or more ROs 405 to be deactivated during a time period 420. Base station 105 may configure the time period 420 (e.g., in downlink message 410 or in a different or previous downlink message), or time period 420 may be included in one or more standards documents, or may be otherwise preconfigured at UE 115. In some examples, the downlink message 410 may instruct the UE to deactivate all ROs 405 within time period 420. In such examples, UE 115 may deactivate all ROs 405 (e.g., RO 405-b, RO 405-c, RO 405-d, RO 405-e, and RO 405-f) that occur prior to the expiration of time period 420. In some examples, UE 115 may initiate a timer having a duration of time period 420, and may deactivate each RO 405 that occurs while the timer is running. In some examples, the downlink message 410 may include instructions to deactivate specific ROs 405 within time period 420. Such instructions may include one or more indices (e.g., RO 405 indices, or SSB indices associated with ROs 405), and UE 115 may deactivate (e.g., may refrain from transmitting RACH messages during) the indicated ROs 405. For example, the downlink message 410 may include an index value (e.g. an RO 405 index value or an SSB index values for an RO 405) for RO 405-c, RO 405-d, and RO 405-f. In such examples, UE 115 may deactivate RO 405-c. RO 405-d, and RO 405-f (e.g., but may consider RO 405-b, RO 405-e, and RO 405-g to be activate). Upon expiration of time period 420, UE 115 may consider all subsequent ROs 405 to be active (e.g., unless otherwise indicate by a subsequent downlink message 410).

UE 115 may indicate a pattern of ROs 405 for deactivation. For example, downlink message 410 may include a bit-map including a pattern of ROs 405 for deactivation. In such examples, downlink message 410 may include a bit-map that indicates (e.g., from a pool of 7 ROs 405), that RO 405-b, RO 405+d, RO 405-f, and RO 405-h are to be deactivated. In such examples, UE 115 may deactivate RO 405-b, RO 405+d, RO 405-f, and RO 405-h (e.g., but may consider RO 405-c, RO 405-e, and RO 405-g, to be activate). The pattern may correspond to ROs 405 or SSBs associated with ROs 405.

Deactivation of ROs 405 or activation of ROs 405 may be specifically indicated in the downlink message 410. For example, as described herein, the downlink message may include an indication of specific indices for ROs 405 or SSBs associated with ROs 405 for activation. Similarly, base station 105 may transmit an activation message indicating activation of one or more ROs 405. For example, base station 105 may instruct UE 115 to deactivate one or more ROs 405 via downlink message 410. In some examples, a subsequent downlink message 415 may include one or more indices indication which deactivated ROs 405 are to be reactivated.

Deactivation of ROs 405 or activation of ROs 405 may be indicated for a specific time period 420. For example, base station 105 may indicate (e.g., via downlink message 410) one or more ROs 405 for deactivation (e.g., all ROs 405 subsequent to downlink message 410) for the duration of time period 420. Upon expiration of time period 420, UE 115 may consider all subsequent ROs 405 to be active. Or, in some examples, UE 115 may deactivate (e.g., may ignore) all ROs 405 subsequent to receiving the downlink message 410 (e.g., including RO 405-g and RO 405-h). However, upon expiration of time period 420, UE 115 may activate RO 405-g and RO 405-h. Or, base station 105 may instruct UE 115 to deactivate one or more ROs 405 according to a pattern (e.g., via a bit-map). However, in some examples, the pattern may be longer than time period 420, or UE 115 may continue to repeat the pattern (e.g., may implement one or more iterations of the pattern), or the pattern may be unending (e.g., the instructions may indicate that all odd numbered indices are to be deactivated). In such examples, upon expiration of time period 420, UE 115 may ignore the pattern and activate (e.g., or reactivate) all subsequent ROs 405. In some examples, UE 115 may consider all ROs deactivated as a default, and may activate one or more ROs as specification instructed in a downlink message 410 (e.g., for a duration of time period 420).

Deactivation of ROs 405 or activation of ROs 405 may be indicated until further signaling or notification. For example, as described herein, base station 105 may instruct UE 115 to deactivate one or more ROs 405 (e.g., according to a pattern or using specific indices, or the like). In some examples, base station 105 may instruct UE to deactivate all subsequent ROs 405. In such examples, UE 115 may deactivate one or more ROs 405 (e.g., specific ROs 405, a pattern of ROs 405, or all ROs 405) subsequent to receiving downlink message 410. UE 115 may apply the indicated deactivation (e.g., to the specific ROs 405, pattern of ROs 405, or all ROs 405) until subsequent signaling is received. For example, base station 105 may transmit downlink message 415 (e.g., a DCI, a MAC-CE, an RRC message, or any combination thereof). Downlink message 415 may include instructions to activate one or more ROs 405, or to terminate a pattern of deactivation, or the like. For instance, if downlink message 410 instructs UE 115 to deactivate all subsequent ROs 405 (e.g., from RO 405-b through RO 405-h). In such examples, UE 115 may ignore all ROs 405 (e.g., may refrain from transmitting RACH messages on the ROs 405). Subsequently (e.g., after the overlap between ROs 405 and higher priority downlink signals is over), base station 105 may transmit downlink message 415, which may instruct UE 115 to reactivate subsequent ROs 405. In such examples, UE 115 may reactivate RO 405-h, and may use RO 405-h for transmitting a RACH message. Similarly, if downlink message 410 instructs UE 115 to deactivate a subset of ROs 405 (e.g., specific ROs 405 or a pattern of ROs 405), then UE 115 may deactivate the ROs according to the instructions until subsequent signaling is received. Downlink message 415 may instruct the UE to terminate the pattern, may update the pattern or indicate new ROs 405 for deactivation or activation, or may reset UE 115 (e.g., all subsequent ROs 405 may be considered active regardless of instructions received in downlink message 410).

Techniques described herein may be applied for a UE 115 operating in half duplex mode. For example, base station 105 may identity an overlap in time between one or more ROs 405 and uplink traffic (e.g., URLLC traffic) that may or shall be transmitted (e.g., according to URLLC latency requirements) during the one or more ROs. In such examples, base station 105 may deactivate one or more ROs, instructing the UE 115 to instead transmit the higher priority uplink traffic. The base station may deactivate, activate, or otherwise update one or more ROs 405 as described herein (e.g., by indicating one or more indices, by indicating a pattern of ROs 405, according to a time period 420, or using additional downlink messages 415, or any combination thereof) for such a half duplex UE 115.

In some examples, base station 105 may configure UE 115 with one or more parameters to address downlink signaling (e.g., or uplink signaling for a UE 115 operating in half duplex mode) that overlaps in time with ROs 405. For example, in addition to, or instead of, deactivating one or more ROs, base station 105 may configure UE 115 with updated RACH parameters for one or more ROs 405. Base station 105 may indicate such updated RACH parameters via a downlink message 410 (e.g., a DCI message, a MAC-CE message, an RRC message, or any combination thereof). The updated RACH parameters may include a beam indicator, a guard band, a transmit power, or the like. Thus, for one or more ROs 405 that overlap with higher priority signaling (e.g., downlink signaling or uplink signaling), base station 105 may configure a new or increased guard band (e.g., in the case of an FDM transmission configuration), an increased transmit power, a new beam on which to transmit (e.g., to avoid or decrease interference), or the like. Base station 105 may configure multiple ROs with updated RACH parameters. Base station 105 may indicate the multiple ROs on which the updated RACH parameters are to be applied in a downlink message 410 that indicates one or more indices (e.g., RO 405 indices or SSB indices associated with ROs 405), or a bit-map indicating a pattern of ROs 405, or based on a time period 420, or based on additional subsequent signaling (e.g., such as downlink message 415), or any combination thereof, as described herein with reference to FIGS. 4 and 5. In some examples, values for the updated RACH parameters may be included in a downlink message 410, or another downlink message, or both (e.g., one or more parameter values or sets of parameter values may be configured via higher layer signaling, and a DCI message may indicate which configuration or which set of parameter values are to be applied to indicated ROs 405).

Figure 5:
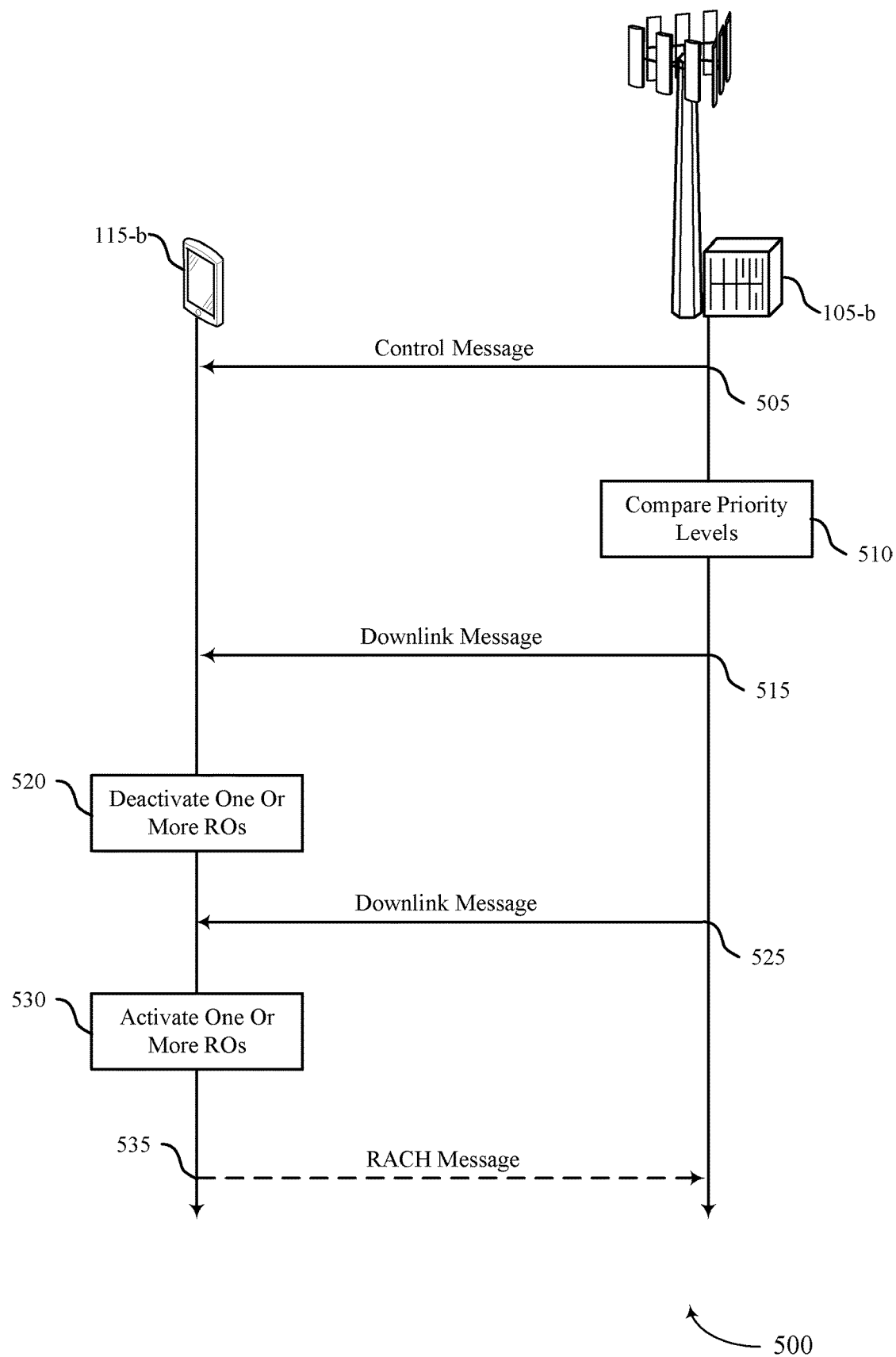
FIG. 5 illustrates an example of a process flow that supports activation and deactivation of random access channel occasions in accordance with aspects of the present disclosure.

FIG. 5 illustrates an example of a process flow 500 that supports activation and deactivation of random access channel occasions in accordance with aspects of the present disclosure. Process flow 500 may include a base station 105-b and a UE 115-b, which may be examples of corresponding devices described with reference to FIGS. 1-4. In some examples, UE 115-b, base station 105-b, or both, may operate in a full duplex mode. For example, base station 105 may transmit, to UE 115, an indication of time resources, frequency resources, spatial resources, or any combination thereof, in which a downlink communication from base station 105 overlaps in time with the one or more ROs. In some examples, UE 115-b may operate in a half duplex mode. In such examples, base station 105-b may transmit, and UE 115-b may receive, an indication of time resources, frequency resources, spatial resources, or any combination thereof, in which a downlink communication to the another UE 115 from base station 105-b overlaps in time with the one or more ROs for UE 115-b. In some examples, where UE 115-b is operating in half duplex mode, base station 105-b may transmit an indication of time resources, frequency resources, spatial resources, or any combination thereof, in which an uplink communication from UE 115-b to base station 105-b overlaps in time with the one or more ROs.

Base station 105-b may configure one or more ROs at UE 115-b. For example, at 505, base station 105-b may transmit a control message to UE 115-b. The control message may indicate multiple ROs (e.g., ROs 405 as illustrated and described with reference to FIG. 4) for transmitting RACH messages to base station 105-b.

Base station 105-b may identify uplink and downlink transmissions, or multiple uplink transmissions, that have different priority levels. For example, base station 105-b may compare a priority level of uplink signaling or downlink signaling scheduled during one or more of the ROs configured at 505 with RACH procedures associated with the ROs. In some examples, base station 105-b may determine that the overlapping uplink or downlink signaling (e.g., URLLC signaling) has a higher priority level than RACH messages that could be transmitted on the ROs. In such examples, base station 105-b may determine to deactivate one or more ROs that overlap in time with the higher priority signaling.

At 515, base station 105-b may transmit, and UE 115-b may receive, a downlink message. The downlink message may be a DCI, a MAC-CE, an RRC message, or any combination thereof. In examples, where the downlink message is a DCI, the DCI may be addressed to UE 115-b, or may be a group common DCI addressed to a set of UEs including UE 115-b. The downlink message may include an instruction to deactivate one or more ROs, as described in greater detail herein. At 520, upon receiving the downlink message, UE 115-b may deactivate one or more ROs, as instructed by the downlink message. In such examples, UE 115-b may refrain from transmitting RACH messages during the deactivated ROs.

In some examples, the instructions may include an index for a single RO, an index for an SSB associated with a single RO, a set of indices for a subset of the ROs, or a set of indices for a set of SSBs associated with a subset of the ROs, or any combination thereof. In such examples, UE 115-*b* may deactivate the indicated ROs at 520.

In some examples, UE 115-*b* may identify a time period (e.g., time period 420 as described with reference to FIG. 4). The downlink message received at 515 may include an indication of the time period. The downlink message may also include an indication of one or more indices for the ROs, or SSBs associated with the ROs. In such examples, UE 15-*b* may refrain from using the indicated ROs for the duration of the time period, but may transmit RACH messages (e.g., at 535) during ROs after expiration of the time period. In some examples, UE 115-*b* may deactivate all ROs for the duration of the time period, and may then reactivate (e.g., or consider active) all ROs (e.g., at 530) subsequent to expiration of the time period.

In some examples, the downlink message received at 515 may include a bit-map indicating a pattern of ROs or a pattern of SSBs associated with one or more ROs. UE 115-*b* may refrain from using the ROs indicated by the RO pattern, but may then (e.g., after one or more iterations of the pattern, after a time period expires, or after a second downlink message is received) transmit a RACH message during subsequent ROs (e.g., activate ROs at 530).

In some examples, UE 115 may deactivate one or more (e.g., all) ROs after receiving the downlink message at 515. At 525, UE 515-*b* may receive a second downlink message. The second downlink message may instruct UE 115-*b* to activate one or more ROs (e.g., deactivated ROs). For example, if UE 115-*b* deactivates all ROs after receiving the downlink message at 515, then UE 115-*b* may activate all subsequent ROs at 530.

In some examples, base station 105-*b* may transmit a second control message indicating additional ROs. Base station 105-*b* may transmit an indication of resources in which downlink communications from the base station overlap with ROs. In such examples, base station 105-*b* may configure UE 115-*b* with one or more full duplex RACH parameters for the ROs that overlap with higher priority signaling. The full duplex RACH parameters may include updated beams, an updated beam pair, a guard band between the higher priority signaling (e.g., uplink or downlink) and the ROs with which higher priority signaling overlap in time, transmit power, or any combination thereof.

Figure 6:
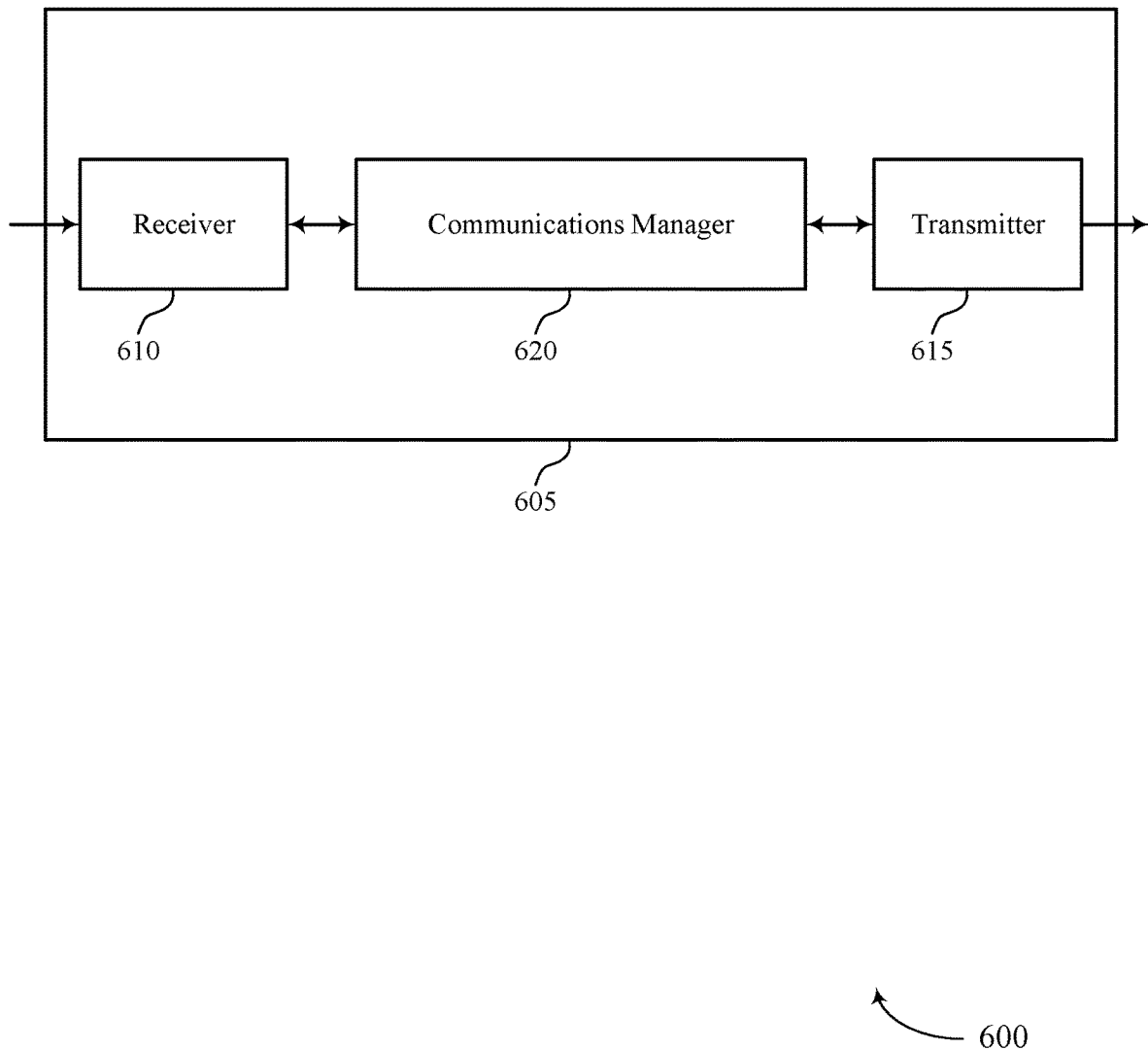
FIGS. 6 and 7 show block diagrams of devices that support activation and deactivation of random access channel occasions in accordance with aspects of the present disclosure.

FIG. 6 shows a block diagram 600 of a device 605 that supports activation and deactivation of random access channel occasions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to activation and deactivation of random access channel occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to activation and deactivation of random access channel occasions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of activation and deactivation of random access channel occasions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, a control message indicating a set of multiple random-access channel occasions for transmitting random-access messages to the base station. The communications manager 620 may be configured as or otherwise support a means for receiving, from the base station, a downlink message including instructions to deactivate one or more random-access channel occasions of the set of multiple random-access channel occasions. The communications manager 620 may be configured as or otherwise support a means for deactivating the one or more random-access channel occasions based on the downlink message, where deactivating the one or more random-access channel occasions includes refraining from transmitting a random-access message during the one or more random-access channel occasions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for activating and deactivating ROs, which may result in decreased system latency, increased system efficiency, more efficient utilization resources, improved battery life, improved user experience, etc.

Figure 7:
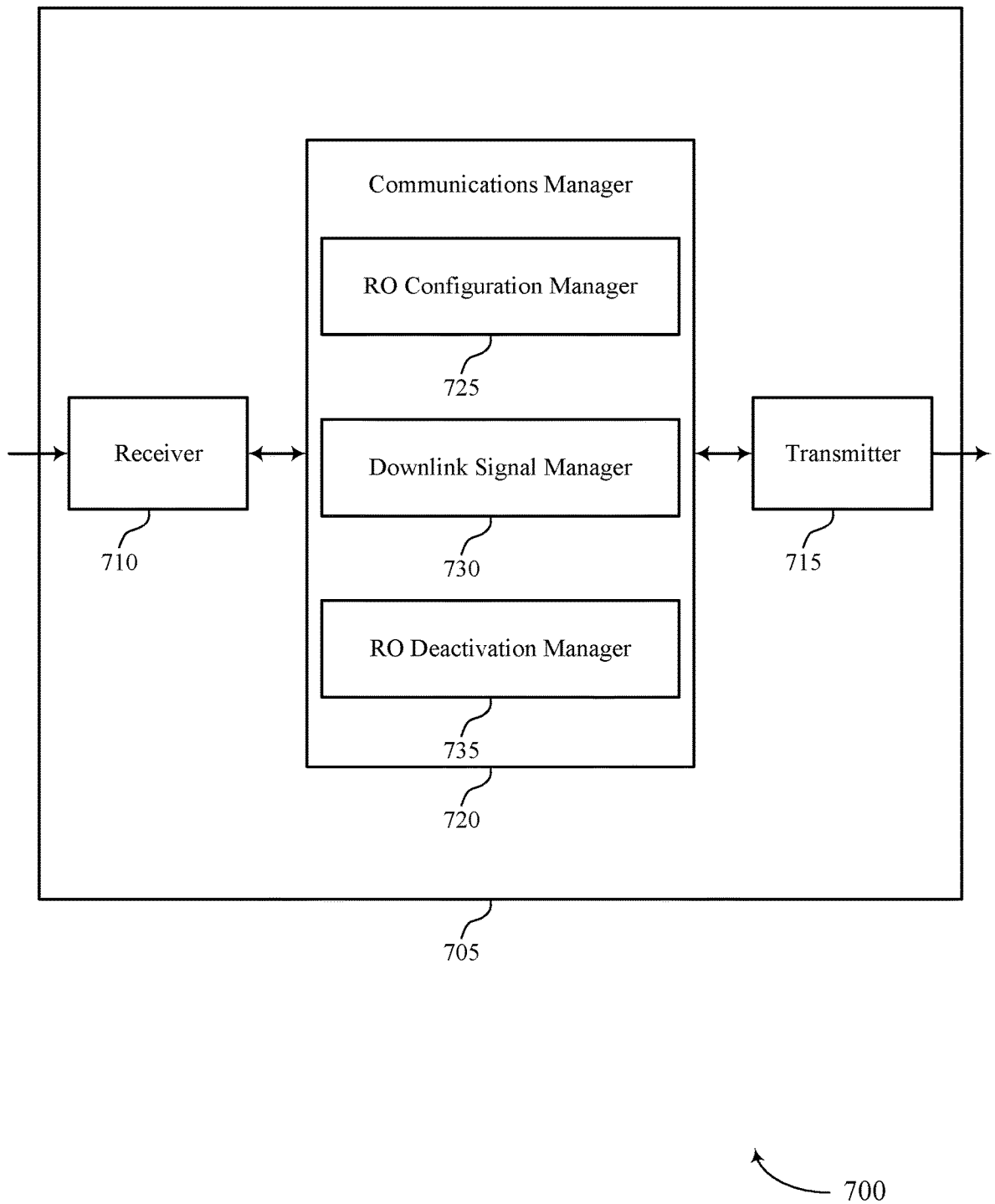

FIG. 7 shows a block diagram 700 of a device 705 that supports activation and deactivation of random access channel occasions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to activation and deactivation of random access channel occasions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to activation and deactivation of random access channel occasions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of activation and deactivation of random access channel occasions as described herein. For example, the communications manager 720 may include a RO configuration manager 725, a downlink signal manager 730, a RO deactivation manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The RO configuration manager 725 may be configured as or otherwise support a means for receiving, from a base station, a control message indicating a set of multiple random-access channel occasions for transmitting random-access messages to the base station. The downlink signal manager 730 may be configured as or otherwise support a means for receiving, from the base station, a downlink message including instructions to deactivate one or more random-access channel occasions of the set of multiple random-access channel occasions. The RO deactivation manager 735 may be configured as or otherwise support a means for deactivating the one or more random-access channel occasions based on the downlink message, where deactivating the one or more random-access channel occasions includes refraining from transmitting a random-access message during the one or more random-access channel occasions.

Figure 8:
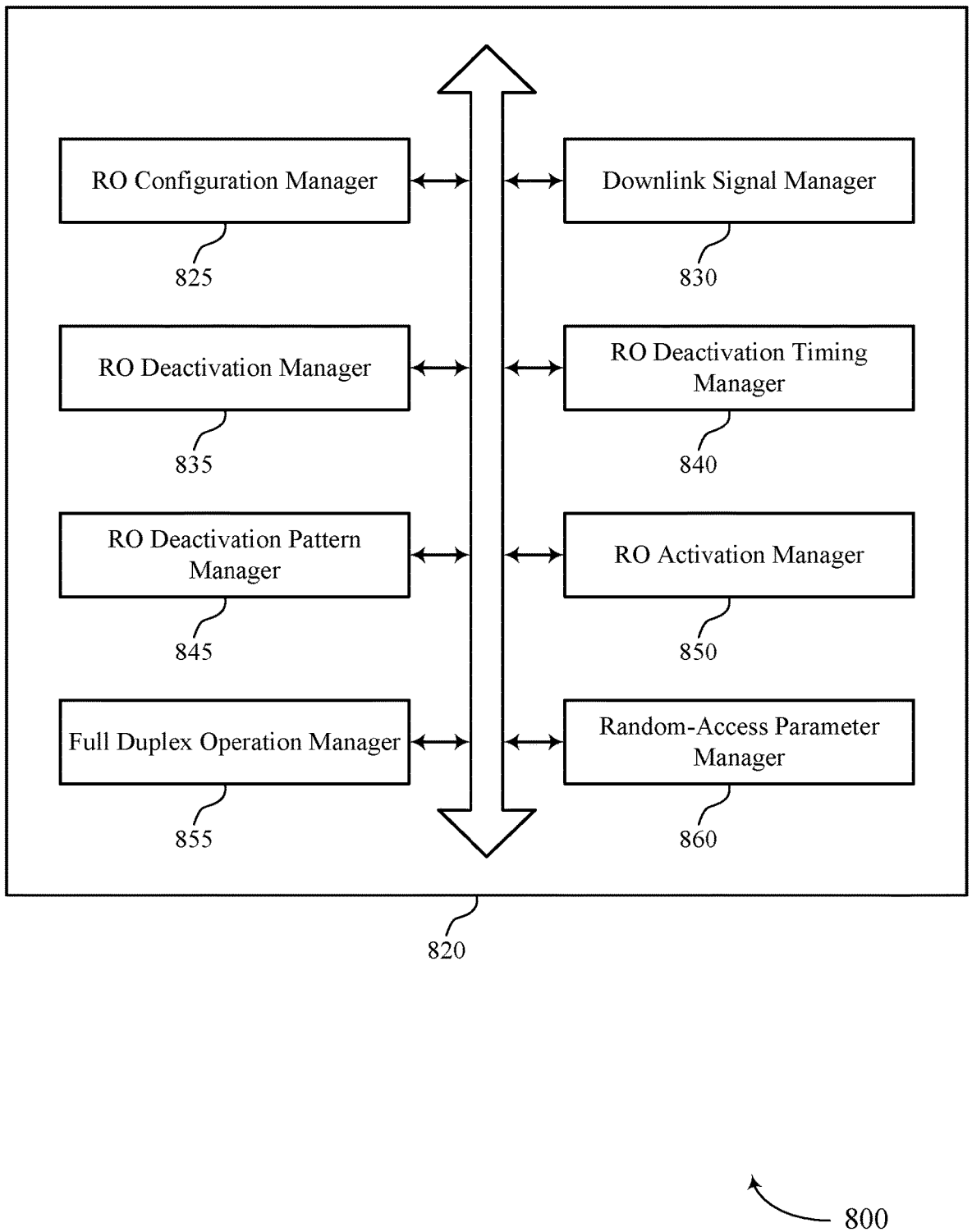
FIG. 8 shows a block diagram of a communications manager that supports activation and deactivation of random access channel occasions in accordance with aspects of the present disclosure.

FIG. 8 shows a block diagram 800 of a communications manager 820 that supports activation and deactivation of random access channel occasions in accordance with aspects of the present disclosure. The communications manager 820 may be an example of aspects of a communications manager 620, a communications manager 720, or both, as described herein. The communications manager 820, or various components thereof, may be an example of means for performing various aspects of activation and deactivation of random access channel occasions as described herein. For example, the communications manager 820 may include a RO configuration manager 825, a downlink signal manager 830, a RO deactivation manager 835, a RO deactivation timing manager 840, a RO deactivation pattern manager 845, a RO activation manager 850, a full duplex operation manager 855, a random-access parameter manager 860, or any combination thereof. Each of these components may communicate, directly or indirectly, with one another (e.g., via one or more buses).

The communications manager 820 may support wireless communications at a UE in accordance with examples as disclosed herein. The RO configuration manager 825 may be configured as or otherwise support a means for receiving, from a base station, a control message indicating a set of multiple random-access channel occasions for transmitting random-access messages to the base station. The downlink signal manager 830 may be configured as or otherwise support a means for receiving, from the base station, a downlink message including instructions to deactivate one or more random-access channel occasions of the set of multiple random-access channel occasions. The RO deactivation manager 835 may be configured as or otherwise support a means for deactivating the one or more random-access channel occasions based on the downlink message, where deactivating the one or more random-access channel occasions includes refraining from transmitting a random-access message during the one or more random-access channel occasions.

In some examples, to support receiving the downlink message, the downlink signal manager 830 may be configured as or otherwise support a means for receiving a downlink control information message, a radio resource control message, a MAC control element (CE), or any combination thereof, including the instruction to deactivate the one or more random-access channel occasions.

In some examples, the downlink control information message is addressed to the UE, or is a group-common downlink control information message addressed to a set of multiple UEs including the UE.

In some examples, an index for a single random-access channel occasion, an index for a synchronization signal block associated with a single random-access channel occasion, a set of indices for a subset of the set of multiple random-access channel occasions, or a set of indices for a set of synchronization signal blocks associated with a subset of the set of multiple random-access channel occasions, or any combination thereof.

In some examples, an indication of a time period. In some examples, one or more indices for the one or more random-access channel occasions within the time period, or one or more indices for one or more synchronization signal blocks associated with the one or more random-access channel occasions within the time period.

In some examples, the RO activation manager 850 may be configured as or otherwise support a means for refraining from using the one or more random-access channel occasions according to the one or more indices for the one or more random-access channel occasions or the one or more indices for the one or more synchronization signal blocks. In some examples, the RO activation manager 850 may be configured as or otherwise support a means for transmitting, upon expiration of the time period, a random access message during a random-access channel occasion of the set of multiple random-access channel occasions.

In some examples, to support instructions, the RO deactivation pattern manager 845 may be configured as or otherwise support a means for a bit-map indicating a pattern of random-access channel occasions or a pattern of synchronization signal blocks associated with the one or more random-access channel occasions.

In some examples, the RO activation manager 850 may be configured as or otherwise support a means for refraining from using the one or more random-access channel occasions according to the pattern of random-access channel occasions or the pattern of synchronization signal blocks. In some examples, the RO activation manager 850 may be configured as or otherwise support a means for transmitting, after the pattern of random-access channel occasions or the pattern of synchronization signal blocks, a random access message during a random-access channel occasion of the set of multiple random-access channel occasions.

In some examples, the RO deactivation timing manager 840 may be configured as or otherwise support a means for determining, based on receiving the downlink message, a time period, where deactivating the one or more random-access channel occasions includes deactivating all random-access channel occasions of the set of multiple random-access channel occasions that occur during the time period. In some examples, the RO activation manager 850 may be configured as or otherwise support a means for refraining from using the one or more random-access channel occasions during the time period based on the deactivating. In some examples, the RO activation manager 850 may be configured as or otherwise support a means for activating a remainder of the set of multiple random-access channel occasions upon expiration of the time period.

In some examples, the RO deactivation manager 835 may be configured as or otherwise support a means for refraining from using the one or more random-access channel occasions, where deactivating the one or more random-access channel occasions includes deactivating all random-access channel occasions of the set of multiple random-access channel occasions. In some examples, the RO activation manager 850 may be configured as or otherwise support a means for receiving, from the base station, a second downlink message including instructions to activate one or more deactivated random-access channel occasions of the set of multiple random-access channel occasions. In some examples, the RO activation manager 850 may be configured as or otherwise support a means for activating each random-access channel occasion of the set of multiple random-access channel occasions that occurs after receiving the second downlink message.

In some examples, the full duplex operation manager 855 may be configured as or otherwise support a means for receiving, from the base station, an indication of time resources, frequency resources, spatial resources, or any combination thereof, in which a downlink communication from the base station overlaps in time with the one or more random-access channel occasions, where receiving the downlink message is based on the downlink communication having a higher priority than random-access transmissions on the one or more random-access channel occasions.

In some examples, the RO configuration manager 825 may be configured as or otherwise support a means for receiving, from the base station, a second control message indicating a second set of multiple random-access channel occasions for transmitting random-access messages to the base station. In some examples, the full duplex operation manager 855 may be configured as or otherwise support a means for receiving, from the base station, an indication of time resources, frequency resources, spatial resources, or any combination thereof, in which a downlink communication from the base station overlaps in time with one or more random-access channel occasions of the second set of multiple random-access occasions. In some examples, the random-access parameter manager 860 may be configured as or otherwise support a means for receiving, from the base station, one or more full-duplex random-access parameters for the one or more random-access channel occasions. In some examples, the random-access parameter manager 860 may be configured as or otherwise support a means for transmitting, to the base station, a random-access message on the one or more random-access channel occasions according to the one or more full-duplex random-access parameters.

In some examples, the full-duplex random-access parameters include an updated beam, an updated DL and UL beam pair, a guard band between DL and UL for full duplex transmissions, a transmit power, or any combination thereof.

Figure 9:
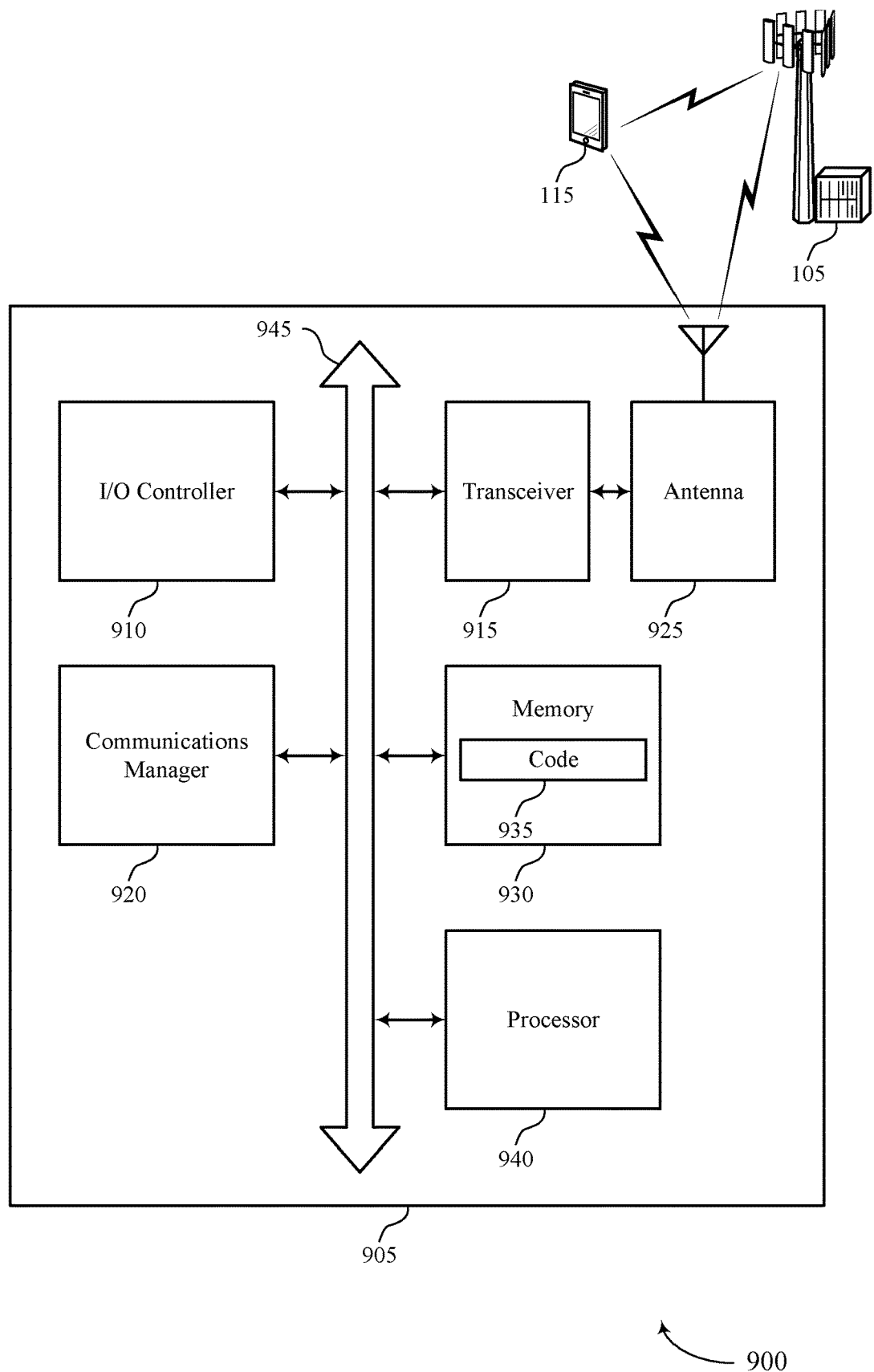
FIG. 9 shows a diagram of a system including a device that supports activation and deactivation of random access channel occasions in accordance with aspects of the present disclosure.

FIG. 9 shows a diagram of a system 900 including a device 905 that supports activation and deactivation of random access channel occasions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting activation and deactivation of random access channel occasions). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, a control message indicating a set of multiple random-access channel occasions for transmitting random-access messages to the base station. The communications manager 920 may be configured as or otherwise support a means for receiving, from the base station, a downlink message including instructions to deactivate one or more random-access channel occasions of the set of multiple random-access channel occasions. The communications manager 920 may be configured as or otherwise support a means for deactivating the one or more random-access channel occasions based on the downlink message, where deactivating the one or more random-access channel occasions includes refraining from transmitting a random-access message during the one or more random-access channel occasions.

By including or configuring the communications manager 920 in accordance with examples as described herein, the device 905 may support techniques for activating and deactivating ROs, which may result in decreased system latency, increased system efficiency, more efficient utilization resources, improved battery life, improved user experience, etc.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of activation and deactivation of random access channel occasions as described herein, or the processor 940 and the memory 930 may be otherwise configured to perform or support such operations.

Figure 10:
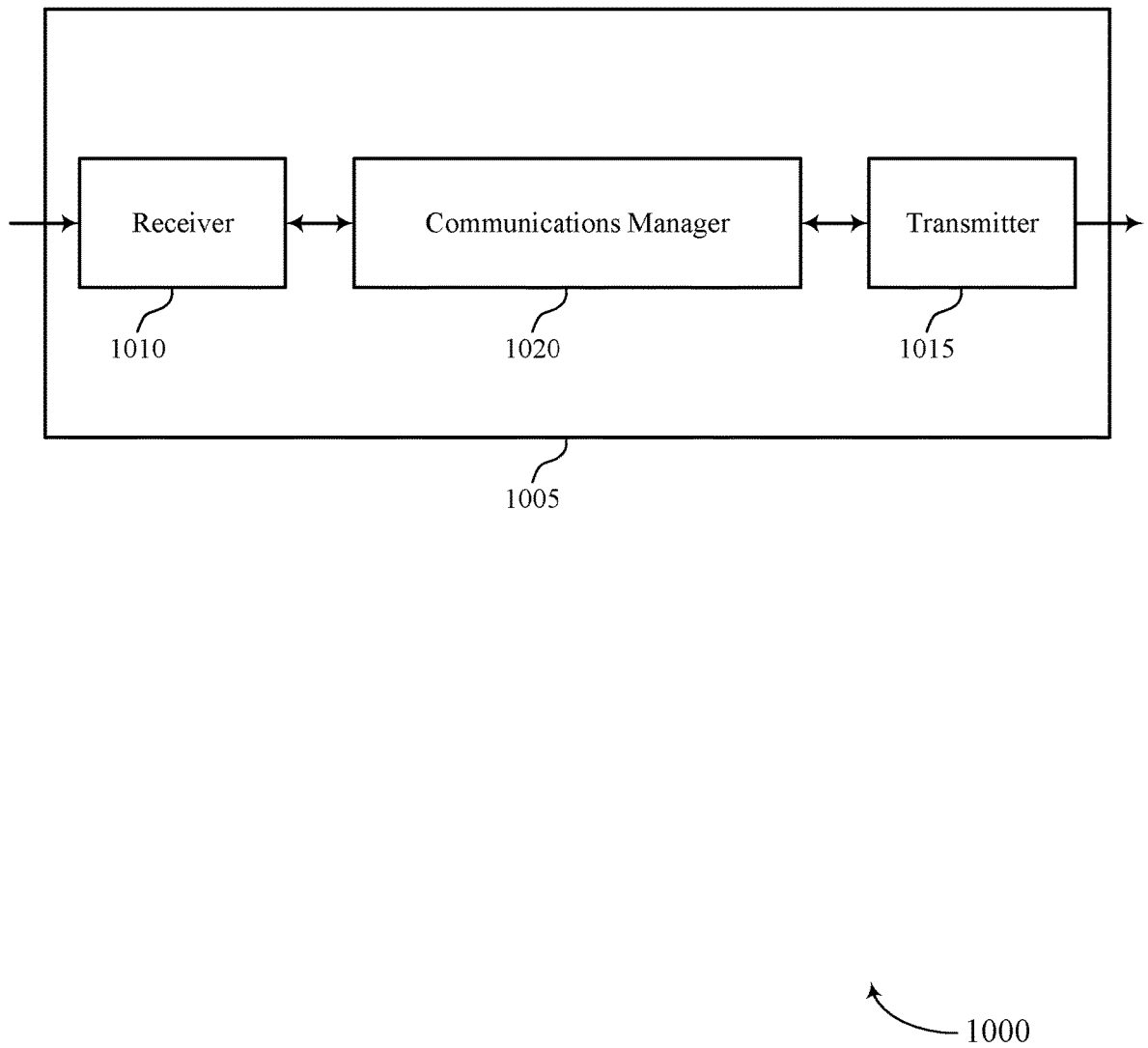
FIGS. 10 and 11 show block diagrams of devices that support activation and deactivation of random access channel occasions in accordance with aspects of the present disclosure.

FIG. 10 shows a block diagram 1000 of a device 1005 that supports activation and deactivation of random access channel occasions in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to activation and deactivation of random access channel occasions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to activation and deactivation of random access channel occasions). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of activation and deactivation of random access channel occasions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, a control message indicating a set of multiple random-access channel occasions for transmitting random-access messages to the base station. The communications manager 1020 may be configured as or otherwise support a means for comparing a priority level of uplink signaling or downlink signaling scheduled during one or more of the random-access channel occasions of the set of multiple random-access channel occasions with random-access procedures associated with the set of multiple random-access channel occasions. The communications manager 1020 may be configured as or otherwise support a means for transmitting, to the UE based on the comparing, a downlink message including instructions to deactivate one or more random-access channel occasions of the set of multiple random-access channel occasions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for activating and deactivating ROs, which may result in decreased system latency, increased system efficiency, more efficient utilization resources, improved battery life, improved user experience, etc.

Figure 11:
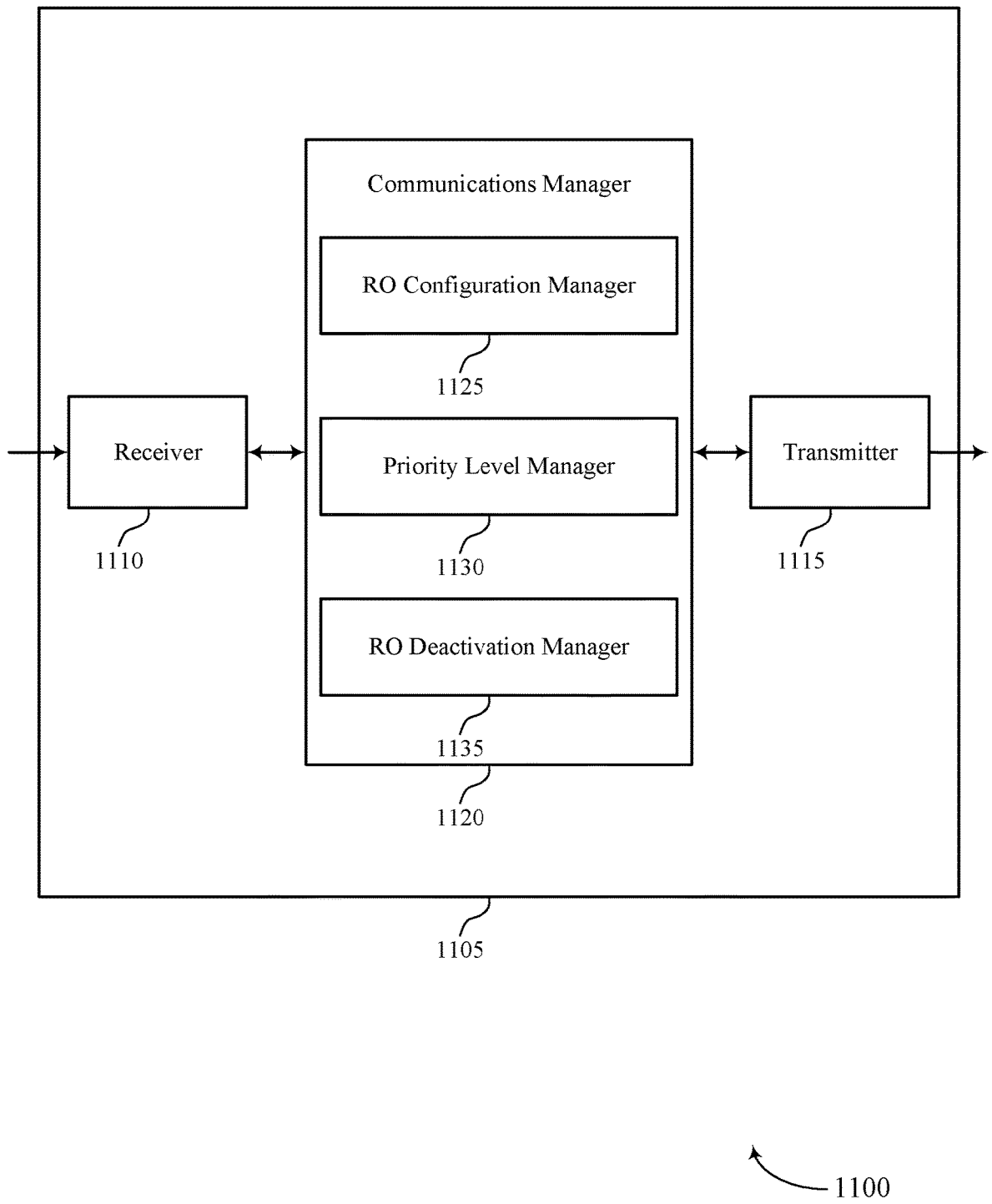

FIG. 11 shows a block diagram 1100 of a device 1105 that supports activation and deactivation of random access channel occasions in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to activation and deactivation of random access channel occasions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to activation and deactivation of random access channel occasions). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of activation and deactivation of random access channel occasions as described herein. For example, the communications manager 1120 may include a RO configuration manager 1125, a priority level manager 1130, a RO deactivation manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The RO configuration manager 1125 may be configured as or otherwise support a means for transmitting, to a UE, a control message indicating a set of multiple random-access channel occasions for transmitting random-access messages to the base station. The priority level manager 1130 may be configured as or otherwise support a means for comparing a priority level of uplink signaling or downlink signaling scheduled during one or more of the random-access channel occasions of the set of multiple random-access channel occasions with random-access procedures associated with the set of multiple random-access channel occasions. The RO deactivation manager 1135 may be configured as or otherwise support a means for transmitting, to the UE based on the comparing, a downlink message including instructions to deactivate one or more random-access channel occasions of the set of multiple random-access channel occasions.

Figure 12:
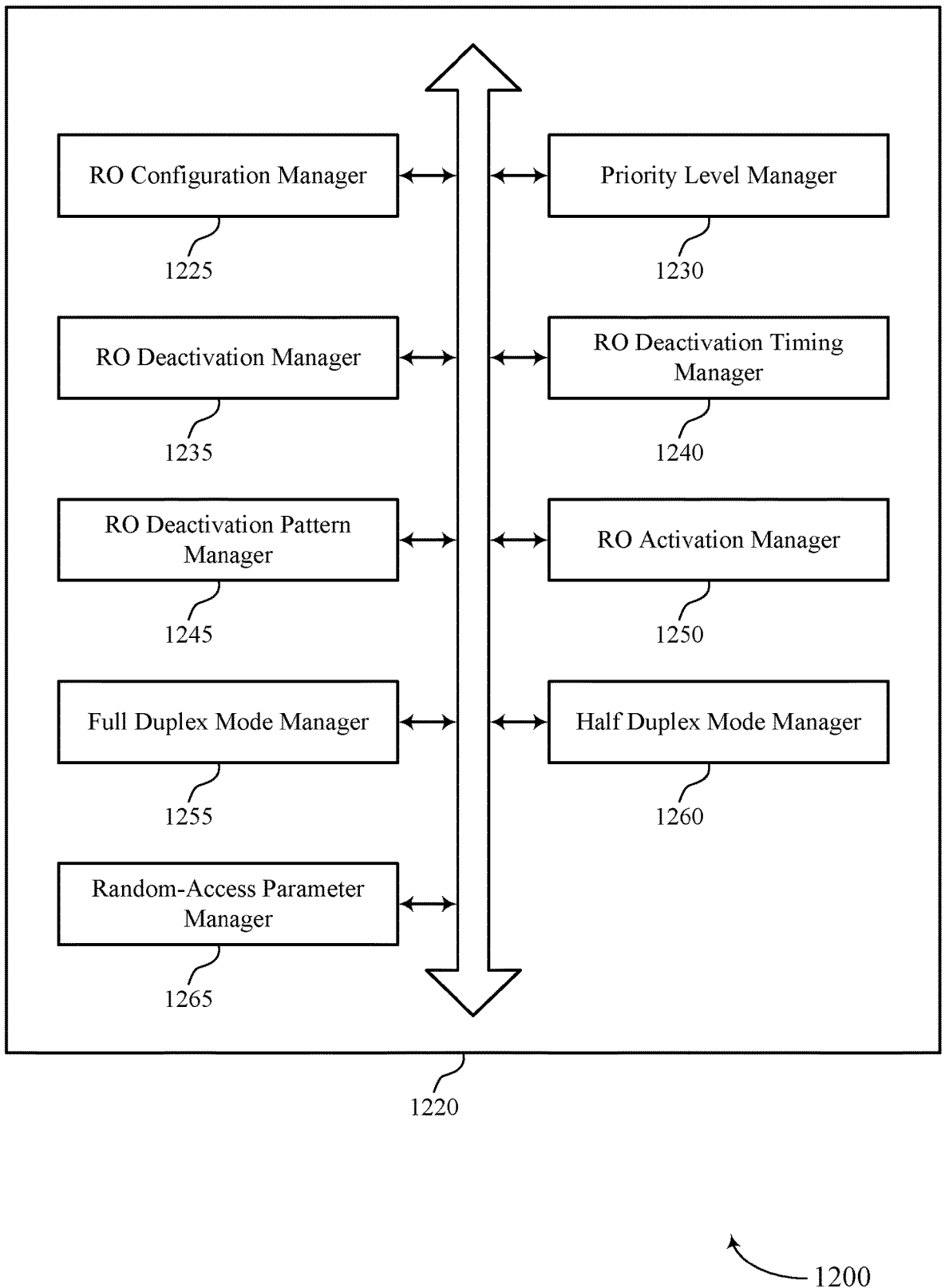
FIG. 12 shows a block diagram of a communications manager that supports activation and deactivation of random access channel occasions in accordance with aspects of the present disclosure.

FIG. 12 shows a block diagram 1200 of a communications manager 1220 that supports activation and deactivation of random access channel occasions in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of activation and deactivation of random access channel occasions as described herein. For example, the communications manager 1220 may include a RO configuration manager 1225, a priority level manager 1230, a RO deactivation manager 1235, a RO deactivation timing manager 1240, a RO deactivation pattern manager 1245, a RO activation manager 1250, a full duplex mode manager 1255, a half duplex mode manager 1260, a random-access parameter manager 1265, or any combination thereof. Each of these components may communicate, directly or indirectly, with one another (e.g., via one or more buses).

The communications manager 1220 may support wireless communications at a base station in accordance with examples as disclosed herein. The RO configuration manager 1225 may be configured as or otherwise support a means for transmitting, to a UE, a control message indicating a set of multiple random-access channel occasions for transmitting random-access messages to the base station. The priority level manager 1230 may be configured as or otherwise support a means for comparing a priority level of uplink signaling or downlink signaling scheduled during one or more of the random-access channel occasions of the set of multiple random-access channel occasions with random-access procedures associated with the set of multiple random-access channel occasions. The RO deactivation manager 1235 may be configured as or otherwise support a means for transmitting, to the UE based on the comparing, a downlink message including instructions to deactivate one or more random-access channel occasions of the set of multiple random-access channel occasions.

In some examples, to support transmitting the downlink message, the RO deactivation manager 1235 may be configured as or otherwise support a means for transmitting a downlink control information message, a radio resource control message, a MAC control element (CE), or any combination thereof, including an instruction to deactivate the one or more random-access channel occasions.

In some examples, the downlink control information message is addressed to the UE, or is a group-common downlink control information message addressed to a set of multiple UEs including the UE.

In some examples, an index for a single random-access channel occasion, an index for a synchronization signal block associated with a single random-access channel occasion, a set of indices for a subset of the set of multiple random-access channel occasions, or a set of indices for a set of synchronization signal blocks associated with a subset of the set of multiple random-access channel occasions, or any combination thereof.

In some examples, an indication of a time period. In some examples, one or more indices for the one or more random-access channel occasions within the time period, or one or more indices for one or more synchronization signal blocks associated with the one or more random-access channel occasions within the time period.

In some examples, a bit-map indicating a pattern of random-access channel occasions or a pattern of synchronization signal blocks associated with the one or more random-access channel occasions.

In some examples, the RO activation manager 1250 may be configured as or otherwise support a means for transmitting, to the UE, a second downlink message including instructions to activate one or more deactivated random-access channel occasions of the set of multiple random-access channel occasions.

In some examples, the full duplex mode manager 1255 may be configured as or otherwise support a means for transmitting, to the UE operating in full duplex mode, an indication of time resources, frequency resources, spatial resources, or any combination thereof, in which a downlink communication to the UE from the base station overlaps in time with the one or more random-access channel occasions, and where transmitting the downlink message is based on the downlink communication having a higher priority level than the random-access procedures associated with the set of multiple random-access channel occasions.

In some examples, the half duplex mode manager 1260 may be configured as or otherwise support a means for transmitting, to a second UE operating in half duplex mode, an indication of time resources, frequency resources, spatial resources, or any combination thereof, in which a downlink communication to the second UE from the base station overlaps in time with the one or more random-access channel occasions for the UE, and where transmitting the downlink message to the UE is based on the downlink communication to the second UE having a higher priority level than the random-access procedures associated with the set of multiple random-access channel occasions.

In some examples, the half duplex mode manager 1260 may be configured as or otherwise support a means for transmitting, to the UE operating in half duplex mode, an indication of time resources, frequency resources, spatial resources, or any combination thereof, in which an uplink communication from the UE to the base station overlaps in time with the one or more random-access channel occasions, and where transmitting the downlink message is based on the uplink communication having a higher priority level than the random-access procedures associated with the set of multiple random-access channel occasions.

In some examples, the RO configuration manager 1225 may be configured as or otherwise support a means for transmitting, to the UE, a second control message indicating a second set of multiple random-access channel occasions for transmitting random-access messages to the base station. In some examples, the full duplex mode manager 1255 may be configured as or otherwise support a means for transmitting, to the UE, an indication of time resources, frequency resources, spatial resources, or any combination thereof, in which a downlink communication from the base station overlaps in time with one or more random-access channel occasions of the second set of multiple random-access occasions. In some examples, the random-access parameter manager 1265 may be configured as or otherwise support a means for transmitting, to the UE, one or more full-duplex random-access parameters for the one or more random-access channel occasions. In some examples, the random-access parameter manager 1265 may be configured as or otherwise support a means for receiving, from the UE, a random-access message on the one or more random-access channel occasions according to the one or more full-duplex random-access parameters.

In some examples, an updated beam, an updated DL and UL beam pair, a guard band between DL and UL for full duplex transmissions, a transmit power, or any combination thereof.

Figure 13:
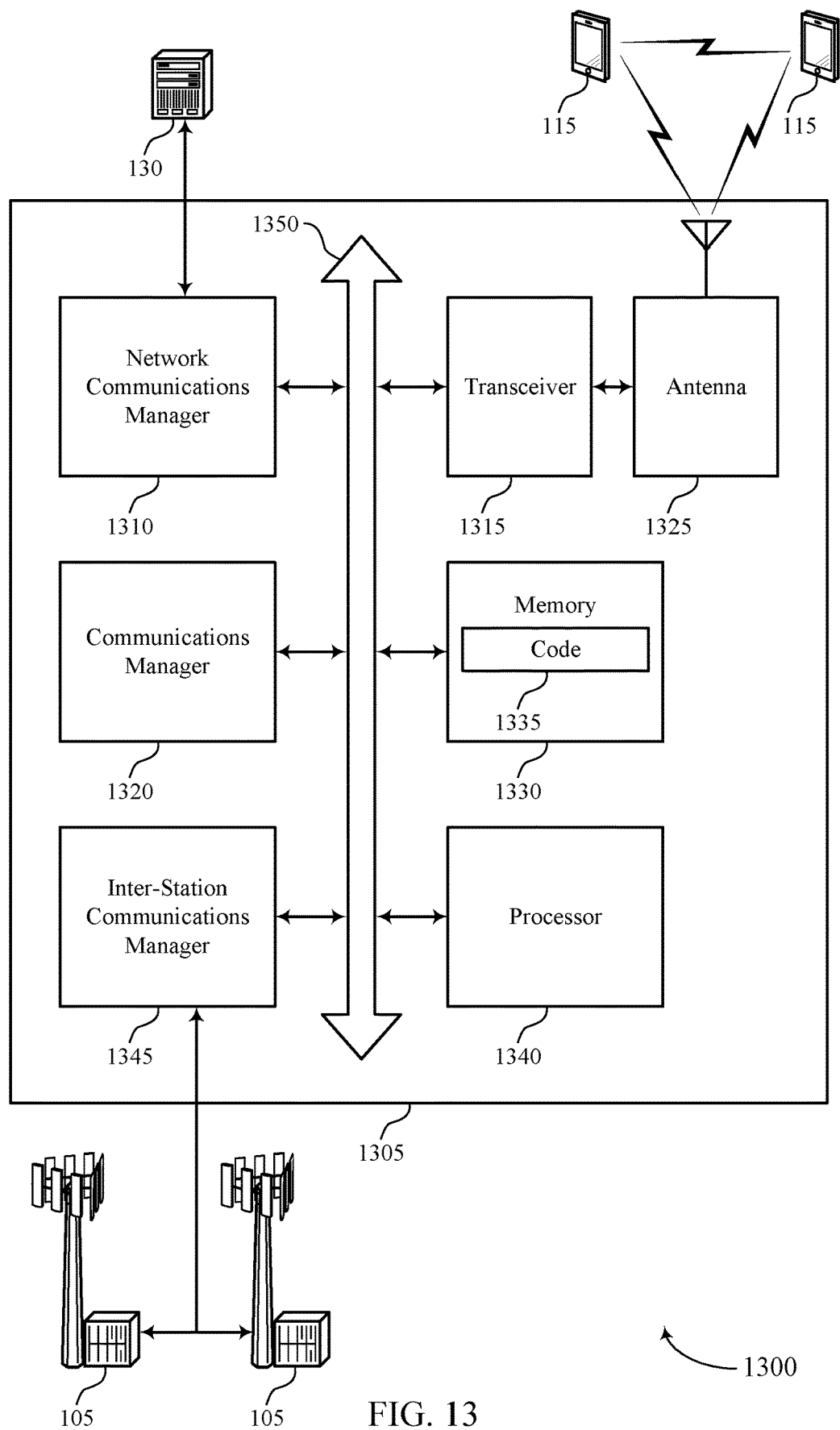
FIG. 13 shows a diagram of a system including a device that supports activation and deactivation of random access channel occasions in accordance with aspects of the present disclosure.

FIG. 13 shows a diagram of a system 1300 including a device 1305 that supports activation and deactivation of random access channel occasions in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting activation and deactivation of random access channel occasions). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, a control message indicating a set of multiple random-access channel occasions for transmitting random-access messages to the base station. The communications manager 1320 may be configured as or otherwise support a means for comparing a priority level of uplink signaling or downlink signaling scheduled during one or more of the random-access channel occasions of the set of multiple random-access channel occasions with random-access procedures associated with the set of multiple random-access channel occasions. The communications manager 1320 may be configured as or otherwise support a means for transmitting, to the UE based on the comparing, a downlink message including instructions to deactivate one or more random-access channel occasions of the set of multiple random-access channel occasions.

By including or configuring the communications manager 1320 in accordance with examples as described herein, the device 1305 may support techniques for activating and deactivating ROs, which may result in decreased system latency, increased system efficiency, more efficient utilization resources, improved battery life, improved user experience, etc.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of activation and deactivation of random access channel occasions as described herein, or the processor 1340 and the memory 1330 may be otherwise configured to perform or support such operations.

Figure 14:
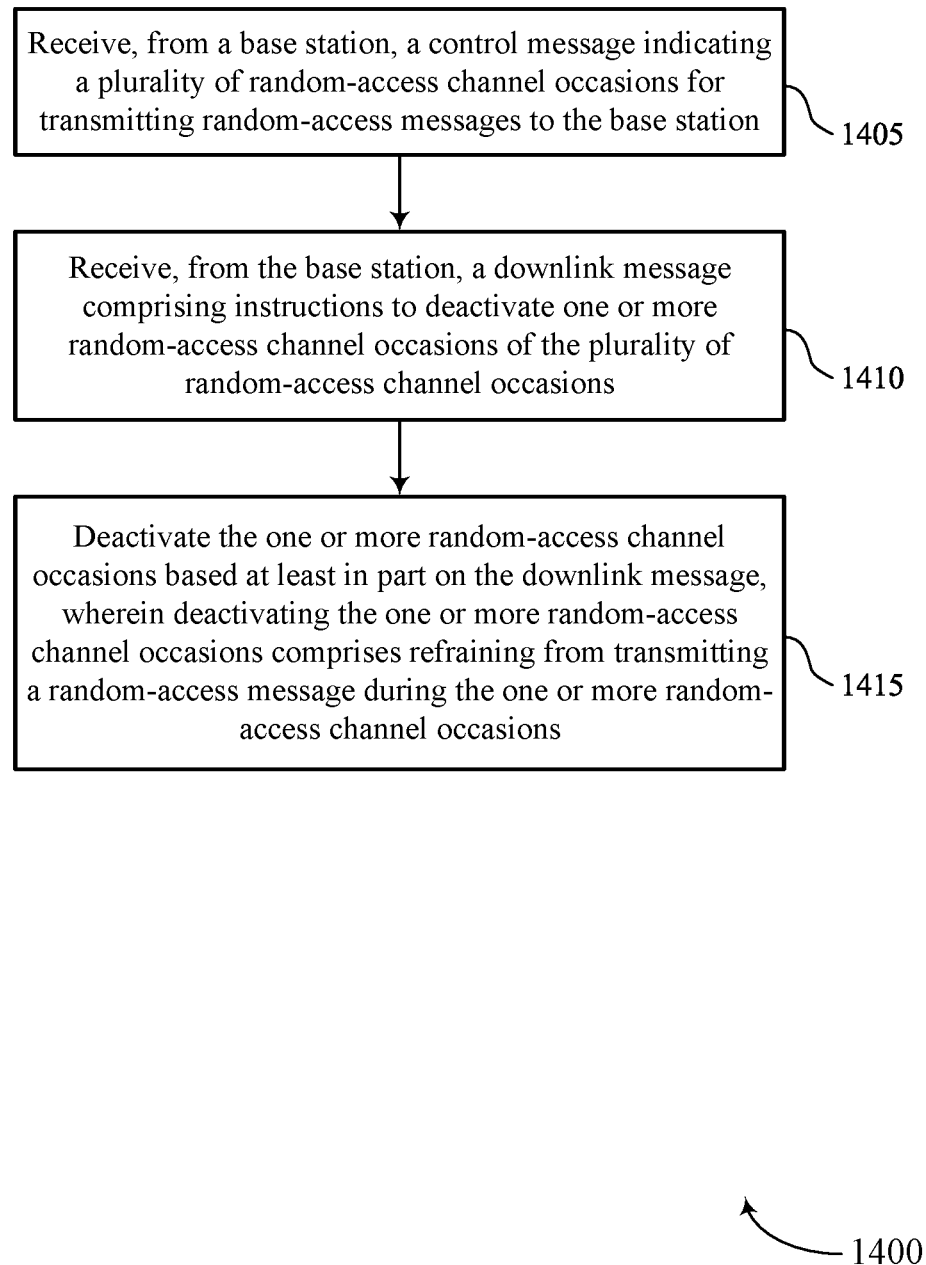
FIGS. 14 through 17 show flowcharts illustrating methods that support activation and deactivation of random access channel occasions in accordance with aspects of the present disclosure.

FIG. 14 shows a flowchart illustrating a method 1400 that supports activation and deactivation of random access channel occasions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control message indicating a set of multiple random-access channel occasions for transmitting random-access messages to the base station. The operations of 1405 may be performed in accordance with examples as disclosed herein. In some examples, aspects of the operations of 1405 may be performed by a RO configuration manager 825 as described with reference to FIG. 8.

At 1410, the method may include receiving, from the base station, a downlink message including instructions to deactivate one or more random-access channel occasions of the set of multiple random-access channel occasions. The operations of 1410 may be performed in accordance with examples as disclosed herein. In some examples, aspects of the operations of 1410 may be performed by a downlink signal manager 830 as described with reference to FIG. 8.

At 1415, the method may include deactivating the one or more random-access channel occasions based on the downlink message, where deactivating the one or more random-access channel occasions includes refraining from transmitting a random-access message during the one or more random-access channel occasions. The operations of 1415 may be performed in accordance with examples as disclosed herein. In some examples, aspects of the operations of 1415 may be performed by a RO deactivation manager 835 as described with reference to FIG. 8.

Figure 15:
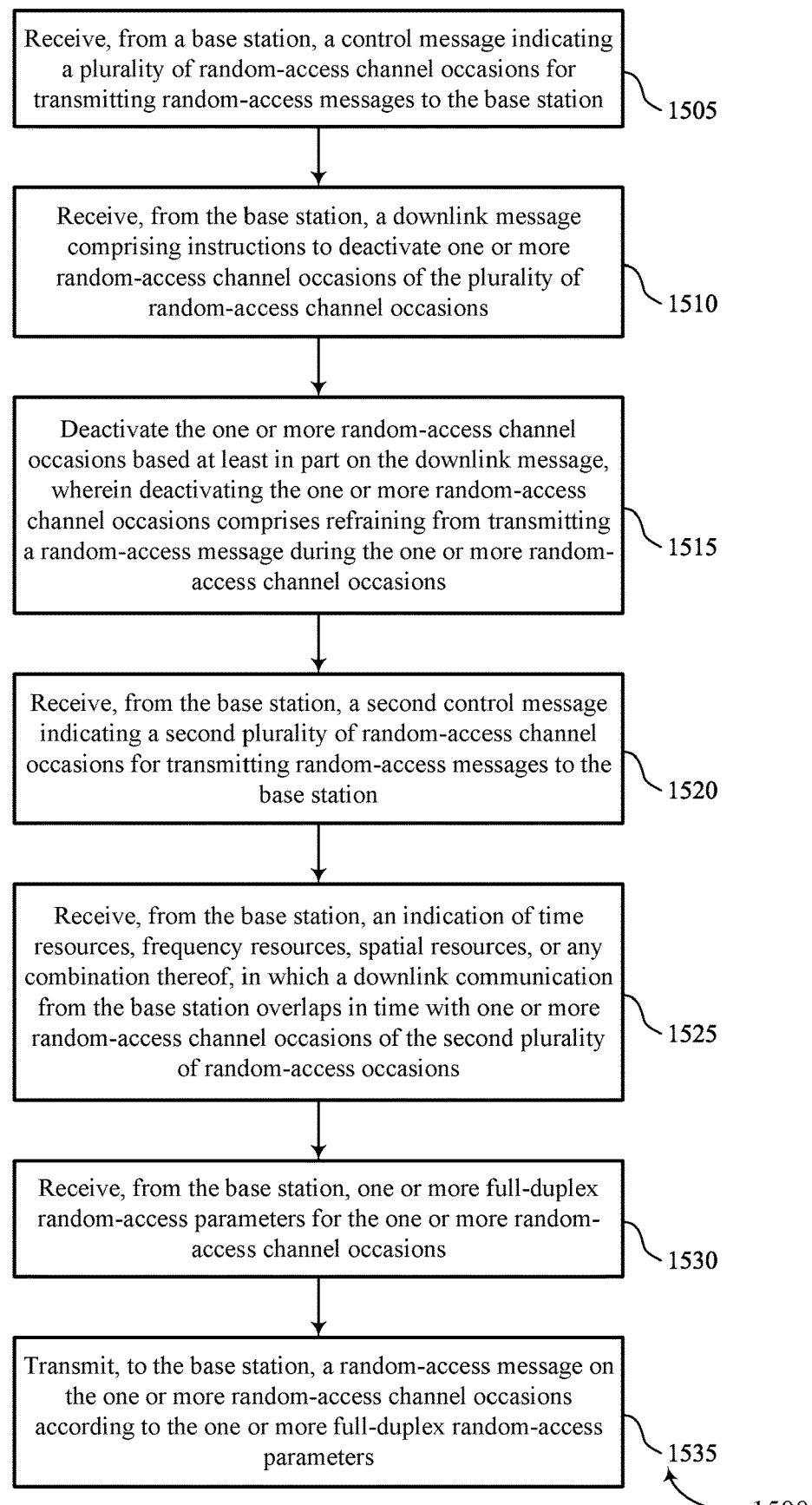

FIG. 15 shows a flowchart illustrating a method 1500 that supports activation and deactivation of random access channel occasions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, a control message indicating a set of multiple random-access channel occasions for transmitting random-access messages to the base station. The operations of 1505 may be performed in accordance with examples as disclosed herein. In some examples, aspects of the operations of 1505 may be performed by a RO configuration manager 825 as described with reference to FIG. 8.

At 1510, the method may include receiving, from the base station, a downlink message including instructions to deactivate one or more random-access channel occasions of the set of multiple random-access channel occasions. The operations of 1510 may be performed in accordance with examples as disclosed herein. In some examples, aspects of the operations of 1510 may be performed by a downlink signal manager 830 as described with reference to FIG. 8.

At 1515, the method may include deactivating the one or more random-access channel occasions based on the downlink message, where deactivating the one or more random-access channel occasions includes refraining from transmitting a random-access message during the one or more random-access channel occasions. The operations of 1515 may be performed in accordance with examples as disclosed herein. In some examples, aspects of the operations of 1515 may be performed by a RO deactivation manager 835 as described with reference to FIG. 8.

At 1520, the method may include receiving, from the base station, a second control message indicating a second set of multiple random-access channel occasions for transmitting random-access messages to the base station. The operations of 1520 may be performed in accordance with examples as disclosed herein. In some examples, aspects of the operations of 1520 may be performed by a RO configuration manager 825 as described with reference to FIG. 8.

At 1525, the method may include receiving, from the base station, an indication of time resources, frequency resources, spatial resources, or any combination thereof, in which a downlink communication from the base station overlaps in time with one or more random-access channel occasions of the second set of multiple random-access occasions. The operations of 1525 may be performed in accordance with examples as disclosed herein. In some examples, aspects of the operations of 1525 may be performed by a full duplex operation manager 855 as described with reference to FIG. 8.

At 1530, the method may include receiving, from the base station, one or more full-duplex random-access parameters for the one or more random-access channel occasions. The operations of 1530 may be performed in accordance with examples as disclosed herein. In some examples, aspects of the operations of 1530 may be performed by a random-access parameter manager 860 as described with reference to FIG. 8.

At 1535, the method may include transmitting, to the base station, a random-access message on the one or more random-access channel occasions according to the one or more full-duplex random-access parameters. The operations of 1535 may be performed in accordance with examples as disclosed herein. In some examples, aspects of the operations of 1535 may be performed by a random-access parameter manager 860 as described with reference to FIG. 8.

Figure 16:
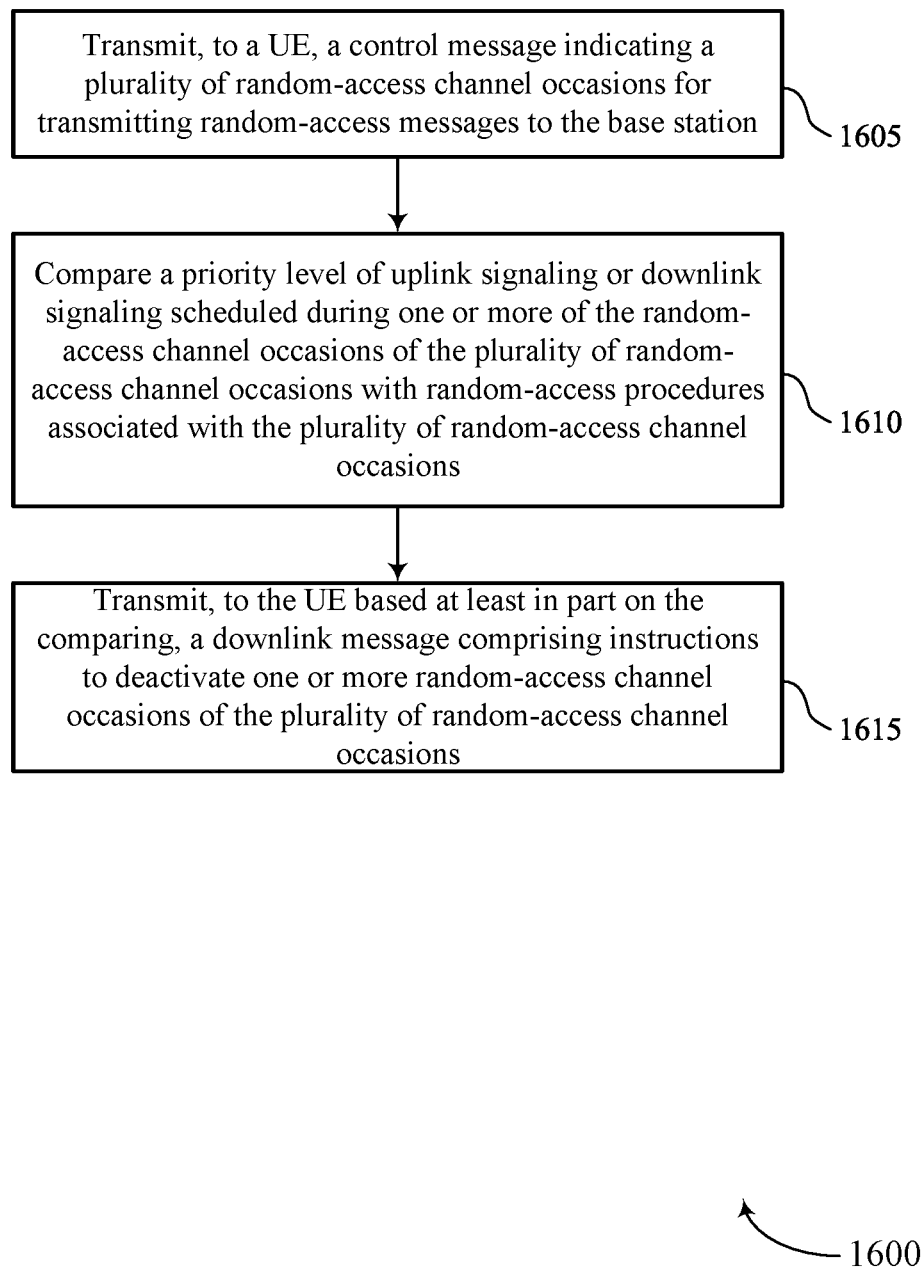

FIG. 16 shows a flowchart illustrating a method 1600 that supports activation and deactivation of random access channel occasions in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, a control message indicating a set of multiple random-access channel occasions for transmitting random-access messages to the base station. The operations of 1605 may be performed in accordance with examples as disclosed herein. In some examples, aspects of the operations of 1605 may be performed by a RO configuration manager 1225 as described with reference to FIG. 12.

At 1610, the method may include comparing a priority level of uplink signaling or downlink signaling scheduled during one or more of the random-access channel occasions of the set of multiple random-access channel occasions with random-access procedures associated with the set of multiple random-access channel occasions. The operations of 1610 may be performed in accordance with examples as disclosed herein. In some examples, aspects of the operations of 1610 may be performed by a priority level manager 1230 as described with reference to FIG. 12.

At 1615, the method may include transmitting, to the UE based on the comparing, a downlink message including instructions to deactivate one or more random-access channel occasions of the set of multiple random-access channel occasions. The operations of 1615 may be performed in accordance with examples as disclosed herein. In some examples, aspects of the operations of 1615 may be performed by a RO deactivation manager 1235 as described with reference to FIG. 12.

Figure 17:
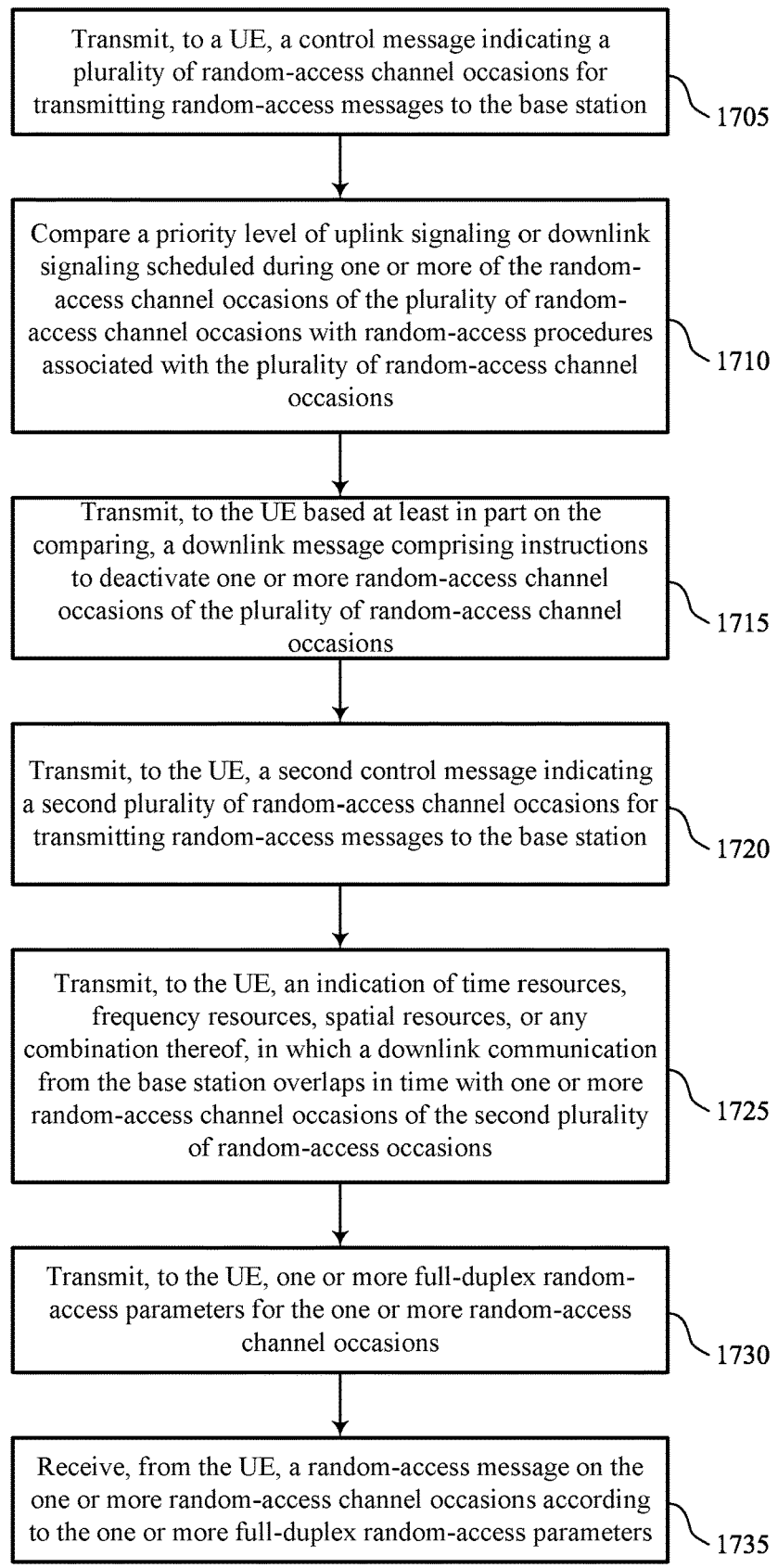

FIG. 17 shows a flowchart illustrating a method 1700 that supports activation and deactivation of random access channel occasions in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, a control message indicating a set of multiple random-access channel occasions for transmitting random-access messages to the base station. The operations of 1705 may be performed in accordance with examples as disclosed herein. In some examples, aspects of the operations of 1705 may be performed by a RO configuration manager 1225 as described with reference to FIG. 12.

At 1710, the method may include comparing a priority level of uplink signaling or downlink signaling scheduled during one or more of the random-access channel occasions of the set of multiple random-access channel occasions with random-access procedures associated with the set of multiple random-access channel occasions. The operations of 1710 may be performed in accordance with examples as disclosed herein. In some examples, aspects of the operations of 1710 may be performed by a priority level manager 1230 as described with reference to FIG. 12.

At 1715, the method may include transmitting, to the UE based on the comparing, a downlink message including instructions to deactivate one or more random-access channel occasions of the set of multiple random-access channel occasions. The operations of 1715 may be performed in accordance with examples as disclosed herein. In some examples, aspects of the operations of 1715 may be performed by a RO deactivation manager 1235 as described with reference to FIG. 12.

At 1720, the method may include transmitting, to the UE, a second control message indicating a second set of multiple random-access channel occasions for transmitting random-access messages to the base station. The operations of 1720 may be performed in accordance with examples as disclosed herein. In some examples, aspects of the operations of 1720 may be performed by a RO configuration manager 1225 as described with reference to FIG. 12.

At 1725, the method may include transmitting, to the UE, an indication of time resources, frequency resources, spatial resources, or any combination thereof, in which a downlink communication from the base station overlaps in time with one or more random-access channel occasions of the second set of multiple random-access occasions. The operations of 1725 may be performed in accordance with examples as disclosed herein. In some examples, aspects of the operations of 1725 may be performed by a full duplex mode manager 1255 as described with reference to FIG. 12.

At 1730, the method may include transmitting, to the UE, one or more full-duplex random-access parameters for the one or more random-access channel occasions. The operations of 1730 may be performed in accordance with examples as disclosed herein. In some examples, aspects of the operations of 1730 may be performed by a random-access parameter manager 1265 as described with reference to FIG. 12.

At 1735, the method may include receiving, from the UE, a random-access message on the one or more random-access channel occasions according to the one or more full-duplex random-access parameters. The operations of 1735 may be performed in accordance with examples as disclosed herein. In some examples, aspects of the operations of 1735 may be performed by a random-access parameter manager 1265 as described with reference to FIG. 12.

Aspect 1: A method for wireless communications at a UE, comprising: receiving, from a base station, a control message indicating a plurality of random-access channel occasions for transmitting random-access messages to the base station; receiving, from the base station, a downlink message comprising instructions to deactivate one or more random-access channel occasions of the plurality of random-access channel occasions; and deactivating the one or more random-access channel occasions based at least in part on the downlink message, wherein deactivating the one or more random-access channel occasions comprises refraining from transmitting a random-access message during the one or more random-access channel occasions.

Aspect 2: The method of aspect 1, wherein receiving the downlink message comprises: receiving a downlink control information message, a radio resource control message, a MAC control element (CE), or any combination thereof, comprising the instruction to deactivate the one or more random-access channel occasions.

Aspect 3: The method of aspect 2, wherein the downlink control information message is addressed to the UE, or is a group-common downlink control information message addressed to a plurality of UEs comprising the UE.

Aspect 4: The method of any of aspects 1 through 3, wherein the instructions comprise an index for a single random-access channel occasion, an index for a synchronization signal block associated with a single random-access channel occasion, a set of indices for a subset of the plurality of random-access channel occasions, or a set of indices for a set of synchronization signal blocks associated with a subset of the plurality of random-access channel occasions, or any combination thereof.

Aspect 5: The method of any of aspects 1 through 4, wherein the instructions comprise an indication of a time period; and one or more indices for the one or more random-access channel occasions within the time period, or one or more indices for one or more synchronization signal blocks associated with the one or more random-access channel occasions within the time period.

Aspect 6: The method of aspect 5, further comprising: refraining from using the one or more random-access channel occasions according to the one or more indices for the one or more random-access channel occasions or the one or more indices for the one or more synchronization signal blocks; and transmitting, upon expiration of the time period, a random access message during a random-access channel occasion of the plurality of random-access channel occasions.

Aspect 7: The method of any of aspects 1 through 6, wherein the instructions comprises: a bit-map indicating a pattern of random-access channel occasions or a pattern of synchronization signal blocks associated with the one or more random-access channel occasions.

Aspect 8: The method of aspect 7, further comprising: refraining from using the one or more random-access channel occasions according to the pattern of random-access channel occasions or the pattern of synchronization signal blocks; and transmitting, after the pattern of random-access channel occasions or the pattern of synchronization signal blocks, a random access message during a random-access channel occasion of the plurality of random-access channel occasions.

Aspect 9: The method of any of aspects 1 through 8, further comprising: determining, based at least in part on receiving the downlink message, a time period, wherein deactivating the one or more random-access channel occasions comprises deactivating all random-access channel occasions of the plurality of random-access channel occasions that occur during the time period; refraining from using the one or more random-access channel occasions during the time period based at least in part on the deactivating; and activating a remainder of the plurality of random-access channel occasions upon expiration of the time period.

Aspect 10: The method of any of aspects 1 through 9, further comprising: refraining from using the one or more random-access channel occasions, wherein deactivating the one or more random-access channel occasions comprises deactivating all random-access channel occasions of the plurality of random-access channel occasions; receiving, from the base station, a second control message comprising instructions to activate one or more deactivated random-access channel occasions of the plurality of random-access channel occasions; and activating each random-access channel occasion of the plurality of random-access channel occasions that occurs after receiving the second control message.

Aspect 11: The method of any of aspects 1 through 10, further comprising: receiving, from the base station, an indication of time resources, frequency resources, spatial resources, or any combination thereof, in which a downlink communication from the base station overlaps in time with the one or more random-access channel occasions, wherein receiving the downlink message is based at least in part on the downlink communication having a higher priority than random-access transmissions on the one or more random-access channel occasions.

Aspect 12: The method of any of aspects 1 through 11, further comprising: receiving, from the base station, a second control message indicating a second plurality of random-access channel occasions for transmitting random-access messages to the base station; receiving, from the base station, an indication of time resources, frequency resources, spatial resources, or any combination thereof, in which a downlink communication from the base station overlaps in time with one or more random-access channel occasions of the second plurality of random-access occasions; receiving, from the base station, one or more full-duplex random-access parameters for the one or more random-access channel occasions; and transmitting, to the base station, a random-access message on the one or more random-access channel occasions according to the one or more full-duplex random-access parameters.

Aspect 13: The method of aspect 12, wherein the full-duplex random-access parameters comprise an updated beam, an updated DL and UL beam pair, a guard band between DL and UL for full duplex transmissions, a transmit power, or any combination thereof.

Aspect 14: A method for wireless communications at a base station, comprising: transmitting, to a UE, a control message indicating a plurality of random-access channel occasions for transmitting random-access messages to the base station; comparing a priority level of uplink signaling or downlink signaling scheduled during one or more of the random-access channel occasions of the plurality of random-access channel occasions with random-access procedures associated with the plurality of random-access channel occasions; and transmitting, to the UE based at least in part on the comparing, a downlink message comprising instructions to deactivate one or more random-access channel occasions of the plurality of random-access channel occasions.

Aspect 15: The method of aspect 14, wherein transmitting the downlink message comprises: transmitting a downlink control information message, a radio resource control message, a MAC control element (CE), or any combination thereof, comprising an instruction to deactivate the one or more random-access channel occasions.

Aspect 16: The method of aspect 15, wherein the downlink control information message is addressed to the UE, or is a group-common downlink control information message addressed to a plurality of UEs comprising the UE.

Aspect 17: The method of any of aspects 14 through 16, wherein the instructions comprise an index for a single random-access channel occasion, an index for a synchronization signal block associated with a single random-access channel occasion, a set of indices for a subset of the plurality of random-access channel occasions, or a set of indices for a set of synchronization signal blocks associated with a subset of the plurality of random-access channel occasions, or any combination thereof.

Aspect 18: The method of any of aspects 14 through 17, wherein the instructions comprise an indication of a time period; and one or more indices for the one or more random-access channel occasions within the time period, or one or more indices for one or more synchronization signal blocks associated with the one or more random-access channel occasions within the time period.

Aspect 19: The method of any of aspects 14 through 18, wherein the instructions comprise a bit-map indicating a pattern of random-access channel occasions or a pattern of synchronization signal blocks associated with the one or more random-access channel occasions.

Aspect 20: The method of any of aspects 14 through 19, further comprising: transmitting, to the UE, a second control message comprising instructions to activate one or more deactivated random-access channel occasions of the plurality of random-access channel occasions.

Aspect 21: The method of any of aspects 14 through 20, further comprising: transmitting, to the UE operating in full duplex mode, an indication of time resources, frequency resources, spatial resources, or any combination thereof, in which a downlink communication to the UE from the base station overlaps in time with the one or more random-access channel occasions, and wherein transmitting the downlink message is based at least in part on the downlink communication having a higher priority level than the random-access procedures associated with the plurality of random-access channel occasions.

Aspect 22: The method of any of aspects 14 through 21, further comprising: transmitting, to a second UE operating in half duplex mode, an indication of time resources, frequency resources, spatial resources, or any combination thereof, in which a downlink communication to the second UE from the base station overlaps in time with the one or more random-access channel occasions for the UE, and wherein transmitting the downlink message to the UE is based at least in part on the downlink communication to the second UE having a higher priority level than the random-access procedures associated with the plurality of random-access channel occasions.

Aspect 23: The method of any of aspects 14 through 22, further comprising: transmitting, to the UE operating in half duplex mode, an indication of time resources, frequency resources, spatial resources, or any combination thereof, in which an uplink communication from the UE to the base station overlaps in time with the one or more random-access channel occasions, and wherein transmitting the downlink message is based at least in part on the uplink communication having a higher priority level than the random-access procedures associated with the plurality of random-access channel occasions.

Aspect 24: The method of any of aspects 14 through 23, further comprising: transmitting, to the UE, a second control message indicating a second plurality of random-access channel occasions for transmitting random-access messages to the base station; transmitting, to the UE, an indication of time resources, frequency resources, spatial resources, or any combination thereof, in which a downlink communication from the base station overlaps in time with one or more random-access channel occasions of the second plurality of random-access occasions; transmitting, to the UE, one or more full-duplex random-access parameters for the one or more random-access channel occasions; and receiving, from the UE, a random-access message on the one or more random-access channel occasions according to the one or more full-duplex random-access parameters.

Aspect 25: The method of aspect 24, wherein the full-duplex random-access parameters comprise an updated beam, an updated DL and UL beam pair, a guard band between DL and UL for full duplex transmissions, a transmit power, or any combination thereof.

Aspect 26: An apparatus for wireless communications at a UE, comprising a processor; memory coupled with the processor; and instructions stored in the memory and executable by the processor to cause the apparatus to perform a method of any of aspects 1 through 13.

Aspect 27: An apparatus for wireless communications at a UE, comprising at least one means for performing a method of any of aspects 1 through 13.

Aspect 28: A non-transitory computer-readable medium storing code for wireless communications at a UE, the code comprising instructions executable by a processor to perform a method of any of aspects 1 through 13.

Aspect 29: An apparatus for wireless communications at a base station, comprising a processor; memory coupled with the processor; and instructions stored in the memory and executable by the processor to cause the apparatus to perform a method of any of aspects 14 through 25.

Aspect 30: An apparatus for wireless communications at a base station, comprising at least one means for performing a method of any of aspects 14 through 25.

Aspect 31: A non-transitory computer-readable medium storing code for wireless communications at a base station, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a control message indicating a plurality of random-access channel occasions for transmitting random-access messages to the base station;
   receiving, from the base station, a downlink message comprising instructions to deactivate one or more random-access channel occasions of the plurality of random-access channel occasions, wherein receiving the downlink message to deactivate the one or more random-access channel occasions is based at least in part on a downlink communication having a higher priority than random-access transmissions on the one or more random-access channel occasions; and
   deactivating the one or more random-access channel occasions based at least in part on the downlink message, wherein deactivating the one or more random-access channel occasions comprises refraining from transmitting a random-access message during the one or more random-access channel occasions.

2. The method of claim 1, wherein receiving the downlink message comprises:
   receiving a downlink control information message, a radio resource control message, a media access control (MAC) control element (CE), or any combination thereof, comprising the instruction to deactivate the one or more random-access channel occasions.

3. The method of claim 2, wherein the downlink control information message is addressed to the UE, or is a group-common downlink control information message addressed to a plurality of UEs comprising the UE.

4. The method of claim 1, wherein the instructions comprise an index for a single random-access channel occasion, an index for a synchronization signal block associated with a single random-access channel occasion, a set of indices for a subset of the plurality of random-access channel occasions, or a set of indices for a set of synchronization signal blocks associated with a subset of the plurality of random-access channel occasions, or any combination thereof.

5. The method of claim 1, wherein the instructions comprise:
   an indication of a time period; and
   one or more indices for the one or more random-access channel occasions within the time period, or one or more indices for one or more synchronization signal blocks associated with the one or more random-access channel occasions within the time period.

6. The method of claim 5, further comprising:
   refraining from using the one or more random-access channel occasions according to the one or more indices for the one or more random-access channel occasions or the one or more indices for the one or more synchronization signal blocks; and transmitting, upon expiration of the time period, a random access message during a random-access channel occasion of the plurality of random-access channel occasions.

7. The method of claim 1, wherein the instructions comprises:
a bit-map indicating a pattern of random-access channel occasions or a pattern of synchronization signal blocks associated with the one or more random-access channel occasions.

8. The method of claim 7, further comprising:
refraining from using the one or more random-access channel occasions according to the pattern of random-access channel occasions or the pattern of synchronization signal blocks; and
transmitting, after the pattern of random-access channel occasions or the pattern of synchronization signal blocks, a random access message during a random-access channel occasion of the plurality of random-access channel occasions.

9. The method of claim 1, further comprising:
determining, based at least in part on receiving the downlink message, a time period, wherein deactivating the one or more random-access channel occasions comprises deactivating all random-access channel occasions of the plurality of random-access channel occasions that occur during the time period;
refraining from using the one or more random-access channel occasions during the time period based at least in part on the deactivating; and
activating a remainder of the plurality of random-access channel occasions upon expiration of the time period.

10. The method of claim 1, further comprising:
refraining from using the one or more random-access channel occasions, wherein deactivating the one or more random-access channel occasions comprises deactivating all random-access channel occasions of the plurality of random-access channel occasions;
receiving, from the base station, a second downlink message comprising instructions to activate one or more deactivated random-access channel occasions of the plurality of random-access channel occasions; and
activating each random-access channel occasion of the plurality of random-access channel occasions that occurs after receiving the second downlink message.

11. The method of claim 1, further comprising:
receiving, from the base station, an indication of time resources, frequency resources, spatial resources, or any combination thereof, in which the downlink communication from the base station overlaps in time with the one or more random-access channel occasions.

12. The method of claim 1, further comprising:
receiving, from the base station, a second control message indicating a second plurality of random-access channel occasions for transmitting random-access messages to the base station;
receiving, from the base station, an indication of time resources, frequency resources, spatial resources, or any combination thereof, in which a downlink communication from the base station overlaps in time with one or more random-access channel occasions of the second plurality of random-access channel occasions;
receiving, from the base station, one or more full-duplex random-access parameters for the one or more random-access channel occasions; and transmitting, to the base station, a random-access message on the one or more random-access channel occasions according to the one or more full-duplex random-access parameters.

13. The method of claim 12, wherein the one or more full-duplex random-access parameters comprise an updated beam, an updated DL and UL beam pair, a guard band between DL and UL for full duplex transmissions, a transmit power, or any combination thereof.

14. A method for wireless communications at a base station, comprising:
transmitting, to a user equipment (UE), a control message indicating a plurality of random-access channel occasions for transmitting random-access messages to the base station;
comparing a priority level of uplink signaling or downlink signaling scheduled during one or more of the random-access channel occasions of the plurality of random-access channel occasions with random-access procedures associated with the plurality of random-access channel occasions; and
transmitting, to the UE based at least in part on the comparing, a downlink message comprising instructions to deactivate one or more random-access channel occasions of the plurality of random-access channel occasions.

15. The method of claim 14, wherein transmitting the downlink message comprises:
transmitting a downlink control information message, a radio resource control message, a media access control (MAC) control element (CE), or any combination thereof, comprising an instruction to deactivate the one or more random-access channel occasions.

16. The method of claim 15, wherein the downlink control information message is addressed to the UE, or is a group-common downlink control information message addressed to a plurality of UEs comprising the UE.

17. The method of claim 14, wherein the instructions comprise an index for a single random-access channel occasion, an index for a synchronization signal block associated with a single random-access channel occasion, a set of indices for a subset of the plurality of random-access channel occasions, or a set of indices for a set of synchronization signal blocks associated with a subset of the plurality of random-access channel occasions, or any combination thereof.

18. The method of claim 14, wherein the instructions comprise:
an indication of a time period; and
one or more indices for the one or more random-access channel occasions within the time period, or one or more indices for one or more synchronization signal blocks associated with the one or more random-access channel occasions within the time period.

19. The method of claim 14, wherein the instructions comprise a bit-map indicating a pattern of random-access channel occasions or a pattern of synchronization signal blocks associated with the one or more random-access channel occasions.

20. The method of claim 14, further comprising:
transmitting, to the UE, a second downlink message comprising instructions to activate one or more deactivated random-access channel occasions of the plurality of random-access channel occasions.

21. The method of claim 14, further comprising:
transmitting, to the UE operating in full duplex mode, an indication of time resources, frequency resources, spatial resources, or any combination thereof, in which a downlink communication to the UE from the base station overlaps in time with the one or more random-access channel occasions, and wherein transmitting the downlink message is based at least in part on the downlink communication having a higher priority level than the random-access procedures associated with the plurality of random-access channel occasions.

22. The method of claim 14, further comprising:
transmitting, to a second UE operating in half duplex mode, an indication of time resources, frequency resources, spatial resources, or any combination thereof, in which a downlink communication to the second UE from the base station overlaps in time with the one or more random-access channel occasions for the UE, and wherein transmitting the downlink message to the UE is based at least in part on the downlink communication to the second UE having a higher priority level than the random-access procedures associated with the plurality of random-access channel occasions.

23. The method of claim 14, further comprising:
transmitting, to the UE operating in half duplex mode, an indication of time resources, frequency resources, spatial resources, or any combination thereof, in which an uplink communication from the UE to the base station overlaps in time with the one or more random-access channel occasions, and wherein transmitting the downlink message is based at least in part on the uplink communication having a higher priority level than the random-access procedures associated with the plurality of random-access channel occasions.

24. The method of claim 14, further comprising:
transmitting, to the UE, a second control message indicating a second plurality of random-access channel occasions for transmitting random-access messages to the base station;
transmitting, to the UE, an indication of time resources, frequency resources, spatial resources, or any combination thereof, in which a downlink communication from the base station overlaps in time with one or more random-access channel occasions of the second plurality of random-access occasions;
transmitting, to the UE, one or more full-duplex random-access parameters for the one or more random-access channel occasions; and
receiving, from the UE, a random-access message on the one or more random-access channel occasions according to the one or more full-duplex random-access parameters.

25. The method of claim 24, wherein the one or more full-duplex random-access parameters comprise an updated beam, an updated DL and UL beam pair, a guard band between DL and UL for full duplex transmissions, a transmit power, or any combination thereof.

26. An apparatus for wireless communications at a user equipment (UE), comprising:
a processor;
memory coupled with the processor; and
instructions stored in the memory and executable by the processor to cause the apparatus to:
receive, from a base station, a control message indicating a plurality of random-access channel occasions for transmitting random-access messages to the base station;
receive, from the base station, a downlink message comprising instructions to deactivate one or more random-access channel occasions of the plurality of random-access channel occasions, wherein receiving the downlink message to deactivate the one or more random-access channel occasions is based at least in part on a downlink communication having a higher priority than random-access transmissions on the one or more random-access channel occasions; and
deactivate the one or more random-access channel occasions based at least in part on the downlink message, wherein deactivating the one or more random-access channel occasions comprises refraining from transmitting a random-access message during the one or more random-access channel occasions.

27. The apparatus of claim 26, wherein the instructions to receive the downlink message are executable by the processor to cause the apparatus to:
receive a downlink control information message, a radio resource control message, a media access control (MAC) control element (CE), or any combination thereof, comprising the instruction to deactivate the one or more random-access channel occasions.

28. The apparatus of claim 27, wherein the downlink control information message is addressed to the UE, or is a group-common downlink control information message addressed to a plurality of UEs comprising the UE.

29. The apparatus of claim 26, wherein the instructions are further executable by the processor to cause the apparatus to:
receive, from the base station, a second control message indicating a second plurality of random-access channel occasions for transmitting random-access messages to the base station;
receive, from the base station, an indication of time resources, frequency resources, spatial resources, or any combination thereof, in which a downlink communication from the base station overlaps in time with one or more random-access channel occasions of the second plurality of random-access occasions;
receive, from the base station, one or more full-duplex random-access parameters for the one or more random-access channel occasions; and
transmit, to the base station, a random-access message on the one or more random-access channel occasions according to the one or more full-duplex random-access parameters.

30. An apparatus for wireless communications at a base station, comprising:
a processor;
memory coupled with the processor; and
instructions stored in the memory and executable by the processor to cause the apparatus to:
transmit, to a user equipment (UE), a control message indicating a plurality of random-access channel occasions for transmitting random-access messages to the base station;
compare a priority level of uplink signaling or downlink signaling scheduled during one or more of the random-access channel occasions of the plurality of random-access channel occasions with random-access procedures associated with the plurality of random-access channel occasions; and
transmit, to the UE based at least in part on the comparing, a downlink message comprising instructions to deactivate one or more random-access channel occasions of the plurality of random-access channel occasions.

* * * * *